United States Patent [19]
Yabe et al.

[11] Patent Number: 5,961,222
[45] Date of Patent: Oct. 5, 1999

[54] ANTI-ELECTROLYTIC CORROSION ROLLING BEARING

[75] Inventors: Toshikazu Yabe; Toshimi Takajo; Fumio Ueki; Takahiko Uchiyama; Shigeaki Abe; Takanori Yamada; Magozou Hamamoto; Kiyotoshi Ueda; Yasuhisa Terada; Yukio Ohura, all of Kanagawa, Japan

[73] Assignee: NSK Ltd., Tokyo, Japan

[21] Appl. No.: 08/966,484

[22] Filed: Nov. 7, 1997

Related U.S. Application Data

[63] Continuation-in-part of application No. 08/827,249, Mar. 28, 1997, abandoned.

[30] Foreign Application Priority Data

| Mar. 29, 1996 | [JP] | Japan | 8-77254 |
| Sep. 30, 1996 | [JP] | Japan | 8-259567 |
| Nov. 8, 1996 | [JP] | Japan | 8-296604 |
| Mar. 6, 1997 | [JP] | Japan | 9-51974 |
| May 12, 1997 | [JP] | Japan | 9-135762 |

[51] Int. Cl.$^6$ ................................. F16C 33/62
[52] U.S. Cl. ............................ 384/476; 384/477
[58] Field of Search .................... 384/476, 477, 384/536

[56] References Cited

U.S. PATENT DOCUMENTS

| 2,986,432 | 5/1961 | Schlauch | 384/536 |
| 3,415,500 | 12/1968 | Pethis | 384/536 X |
| 4,854,751 | 8/1989 | Grassmuck et al. | 384/476 X |
| 4,944,611 | 7/1990 | Ankenbauer et al. | 384/476 |
| 5,059,041 | 10/1991 | Watanabe et al. | 384/536 X |
| 5,375,933 | 12/1994 | Mizutani et al. | 384/476 |

FOREIGN PATENT DOCUMENTS

| 1376935 | 12/1974 | United Kingdom | 384/476 |

*Primary Examiner*—Thomas R. Hannon
*Attorney, Agent, or Firm*—Sughrue, Mion, Zinn, MacPeak & Seas, PLLC

[57] ABSTRACT

An anti-electrolytic corrosion rolling bearing having at least an outer race, an inner race, and rolling elements interposed between the outer and inner races, which has an insulating body on at least one of the outer peripheral surface of the outer race, the inner peripheral surface of the inner race, and the side surfaces of the outer race and inner race, said insulating body being composed of an insulating film or insulating member each containing at least one of a thermoplastic synthetic resin, a rubber, and a thermoplastic elastomer as a base material and having a resistivity of not less than $1 \times 10^{13}$ $\Omega \cdot$cm and a thermal conductivity of not less than 0.5 W/m·K.

21 Claims, 13 Drawing Sheets

TOTAL AMOUNT OF FILLERS A AND B (% BY WEIGHT)
A = 20% BY WEIGHT

TOTAL AMOUNT OF FILLERS A AND C (% BY WEIGHT)
A = 20% BY WEIGHT

TOTAL AMOUNT OF FILLERS B AND C (% BY WEIGHT)
B = 20% BY WEIGHT

AMOUNT OF FILLERS C (% BY WEIGHT)

ANTI-ELECTROLYTIC CORROSION ROLLING BEARING

CROSS-REFERENCES OF RELATION APPLICATION

This is a continuation-in-part of an application No. 08/827,249 filed Mar. 28, 1997 now abandoned.

FIELD OF THE INVENTION

This invention relates to an anti-electrolytic corrosion rolling bearing, e.g., for use in motors of rolling stock. More particularly, it relates to an anti-electrolytic corrosion rolling bearing effective in the case where further improvement in heat dissipation properties of the bearing is desired as a measure against the increase of heat evolved in a bearing with the speeding-up of rolling stock. Furthermore, this invention relates to an improvement on a rolling bearing used in a fan motor the speed of which is controlled by an inverter. More particularly, it relates to a rolling bearing protected against electrolytic corrosion when used in a fan motor of an air conditioner, a ventilating fan, a cooling fan, etc.

BACKGROUND OF THE INVENTION

A rolling bearing (hereinafter sometimes referred to simply as a bearing) used, e.g., in motors of rolling stock is conventionally protected from electrolytic corrosion by providing an electrically insulating film on at least one of the members with which the outer race or the inner race is in contact, e.g., the housing or the rotating shaft, so as to prevent an electrical current leaked from the housing or the shaft from running between the rolling members and the races to cause electrolytic corrosion.

For example, JP-A-3-277818 (the term "JP-A" as used herein means an "unexamined published Japanese patent application") proposes an anti-electrolytic corrosion rolling bearing having an insulating film formed of a polyphenylene sulfide resin (hereinafter referred to as a PPS resin) containing glass fiber. JP-A-5-240255 discloses a rolling bearing having an insulating film formed of a PPS resin containing glass fiber and nonfibrous inorganic insulating filler, such as calcium carbonate. The insulating film used in the former bearing is designed to have excellent creep resistance by using a glass fiber-reinforced PPS resin thereby to obtain stable anti-electrolytic corrosion performance. The insulating resin material used in the latter is designed to improve creep resistance without deteriorating injection moldability by using a PPS resin containing not only glass fiber but a nonfibrous inorganic filler thereby to obtain satisfactory moldability as well as stable anti-electrolytic corrosion performance.

The insulating film used in an anti-electrolytic corrosion rolling bearing is required of high creep resistance for the following reason. The insulating film in formed on at least one of the inner race and the outer race that are fitted between a rotating shaft and a housing with a given interference. If the film has poor creep resistance, it will wear thin with time, failing to maintain the interference constant.

With the increasing demand for speeding-up of rolling stock, the amount of heat evolved in a bearing has been increasing. However, any of the materials used in conventional insulating layers has a small thermal conductivity and thereby a high heat insulation action. For example, a synthetic resin has a thermal conductivity of about 0.2 to 0.4 W/m·K. The thermal conductivity of glass fiber, added to a resin, never exceeds the range of from about 1 to 6 W/m·K. Therefore, where a conventional insulating film is used as a film coating a bearing, the heat evolved on revolution of the rolling members hardly escapes, resulting in an increase of the temperature of the bearing. For the reason, further improvement in heat dissipation properties of the bearing is desired.

A rolling bearing in a fan motor is attached with a loose fit or a tight fit with its outer race to the housing and the inner race to the rotating axis of the motor, respectively.

Because a preload is imposed to the bearing by pressing the side of the inner or outer race via a spacer, etc. for the purpose of increasing the rigidity of the bearing and preventing vibrations in the case of not only a tight fit but a loose fit, an electrical connection is made between the outer race and a bracket and between the inner race and the rotating axis.

Increasingly, fan motors have been controlled by means of an inverter capable of varying the number of revolutions to control the air flow. In this case, the motor noise due to switching can be reduced by setting the carrier frequency of the inverter at a high level. The recent improvements in semiconductor devices and circuits have made it feasible. Thus, the carrier frequency of an inverter has now been set at a high level. It follows that the axial voltage generated in the inverter-driven motor increases, which makes a potential difference between the rotating axis and the housing, i.e., between the inner and outer races. Am a result, the electrical current passes through the bearing via the rolling elements. Thus, the possibility of electrolytic corrosion on the inner and outer raceways and the rolling surface of the rolling elements has been increasing.

The following countermeasures have been taken against the possibility of electrolytic corrosion in inverter-driven fan motors.

1) If possible, an electrical brush is set in contact with the rotating axis to keep the axis and the housing at equal potentials thereby preventing a current flow between the inner and outer races.
2) Grease that is made electrically conductive is applied to the bearing to maintain the inner and outer races at equal potentials thereby preventing a current flow between them.
3) Grease comprising a base oil having an increased viscosity is used to thicken the oil film formed between the outer race and the rolling elements and between the inner race and the rolling elements thereby electrically insulating the inner and outer races from each other.
4) Bearings having an insulating film of resins, e.g., polyphenylene sulfide (PPS), or ceramics on the outer peripheral surface or the side of the outer race have recently been proposed.

These conventional countermeasures against electrolytic corrosion have their several disadvantages as follows.

Since the free end of the rotating axis of a fan motor is enclosed in a housing, there is no room for an electrical brush. To the other end of the axis is fixed a fan made of an insulating material, such as synthetic resins. Therefore, it is often difficult to place an electrical brush in contact with the axis. In practice, it is impossible in many cases to set an electrical brush in a fan motor. Even when possible, powder of the brush due to wear is discharged from the motor into the air as dust. This will be a fatal defect where a fan motor is to be used in a clean room.

Grease is made electrically conductive by incorporating a good conductor, such as carbon particles. Therefore, a bearing containing such electrically conductive grease is to make more noise than in using ordinary grease. Besides, use of such a special kind of grease that is expensive leads to an increase of cost.

When grease having a high viscosity base oil is used, the bearing torque increases due to the high viscosity, which results in an increase of temperature. Further, if an alternating current of high frequency passes between the inner and outer races, such a small space as an oil film thickness would be insufficient to shut the current. Furthermore, the state of the oil film undergoes changes due to deterioration of the grease with time or due to infiltration of foreign matter into the grease. As a result, it may occur that conduction and insulation alternate to cause electrolytic corrosion. Therefore, this method cannot be a perfect countermeasure.

As other measure of preventing electrolytic corrosion, the formation of an insulating film composed of plastic or ceramic on the outer race of the bearing is known. A glass fiber-reinforced PPS film, which is an example of the plastic insulating films, has a thermal conductivity of no higher than about 0.2 to 0.4 W/m·k. Therefore, the heat generated on revolution of the bearing hardly escapes, causing the bearing temperature to elevate. In this case, improvement in heat dissipation properties of the rolling bearing is further demanded. In the case where the insulating film is composed of ceramics, after flame spraying the ceramics, the formed film is subjected to cutting to a desired outer diameter and then polished to further increase the precision. Therefore, the cost involved is high an compared with the use of the plastic film.

The formation of an insulating film composed of a resin such as PPS or ceramic on the outer perpherical surface and the sides of an outer race not only results in high cost, but also causes some problems that the insulating film which comes to an interposition between the outer race and a housing makes it difficult to fit the bearing into the housing, and the insulating film is liable to creep between the housing and the outer race.

Attention has been paid to the above-described problems associated with the conventional countermeasures against electrolytic corrosion of rolling bearings used in fan motors.

SUMMARY OF THE INVENTION

A first object of the present invention is to provide an anti-electrolytic corrosion rolling bearing excellent in not only electrical insulating properties and creep resistance but heat dissipation properties, an anti-electrolytic corrosion rolling bearing applicable to high-speed revolution, e.g., in a motor of rolling stock, etc. and having improved heat dissipation properties by providing an insulating resin film having improved thermal conductivity so that the heat evolved on high-speed revolution may escape through the housing, the rotating shaft, etc., or an anti-electrolytic corrosion rolling bearing having an insulating resin film which is excellent in not only heat dissipation properties but electrical insulating properties, effectively shutting off a leakage current from the housing or the shaft to protect the bearing against electrolytic corrosion, and also exhibits satisfactory creep resistance for maintaining the fit to the housing or the shaft in long-term running, the resin film being formed of a synthetic resin composition having excellent molding properties.

A second object of the present invention in to provide a rolling bearing which is protected against electrolytic corrosion by covering the outer peripheral portion of the outer race with an electrically insulating film (hereinafter simply referred to as an insulating film) in place of a problematical conventional countermeasure, such as an electrical brush or special grease, and yet can be fitted into a housing with ease, and the insulating film of which is prevented from creep.

A third object of the present invention is to provide a rolling bearing which is protected against electrolytic corrosion and exhibits improved heat dissipation properties by press-fitting an annular insulating member onto the outer race so as to cover the outer peripheral portion (outer periphery surface and at least one surface of the sides) of the outer race in place of a problematical conventional countermeasure such as an electrical brush or special grease, the annular insulating member being made of a synthetic resin composition and having a resistivity of not less than $1\times10^{13}$ Ω·cm and a thermal conductivity of not less than 0.5 W/m·k.

A fourth object of the present invention is to provide a rolling bearing having anti-electrolytic corrosion properties at low cost by integrally forming a seal and the insulating film to be formed on the outer periphery surface and at least one surface of the sides of the outer race without a problematical conventional countermeasure such an an electrical brush or special grease.

The first object is accomplished by an anti-electrolytic corrosion rolling bearing having an insulating film on at least one of the outer and inner races thereof, the insulating film comprising a synthetic resin composition having a resistivity of not less than $1\times10^{13}$ Ω·cm and a thermal conductivity of not less than 0.5 W/m·K (hereinafter referred to as a first embodiment).

The second object is accomplished by a rolling bearing having at least an outer race, an inner race, and rolling elements interposed between the outer and inner races, in which the outer race has provided a thermoplastic elastomer layer on the outer peripheral portion of the outer race (hereinafter referred to as a second embodiment).

The third object is achieved by a rolling bearing having at least an outer race, an inner race, rolling elements interposed between the outer and inner races, which is obtained by press-fitting an annular insulating member so as to cover the outer peripheral portion (outer periphery surface and at least one surface of both sides) of the outer race and at least one surface of both sides or the bearing, the annular insulating member being made of a synthetic resin composition and having a resistivity of not less than $1\times10^{13}$ Ω·cm and a thermal conductivity of not less than 0.5 W/m·k (hereinafter referred to as a third embodiment).

The fourth object is accomplished by a rolling bearing in which an insulating film is formed on the outer peripheral surface and at least one surface of the sides of the outer race, and a seal and the insulating film are formed integrally (hereinafter referred to as a fourth embodiment). Materials of the insulating film include rubbers and thermoplastic elastomers, such as acrylic rubber, acrylonitrile butadiene rubber (NBR), fluorine rubber, hydrogenated acrylonitrile butadiene rubber (H-NBR), polyester elastomers, and polyamide elastomers. An appropriate selection is made from among them taking oil resistance and heat resistance into consideration.

In the present invention, preferred is a rolling bearing having at least an outer race, an inner race, and rolling elements interposed between the outer and inner races, which has an insulating body on at least one of the outer peripheral surface of the outer race, the inner peripheral surface of the inner race, and the side surfaces of the outer race and inner race, said insulating body being composed of an insulating film or insulating member each containing at least one of a thermoplastic synthetic resin, a rubber, and a thermoplastic elastomer as a base material and having a resistivity of not less than $1 \times 10^{13}$ Ω·cm and a thermal conductivity of not less than 0.5 W/m·k. It is more preferred that the insulating body contains a rubber or a thermoplastic elastomer as a base material, and has a durometer hardness (A scale) of 60 to 90, a thickness of from 0.5 to 5 mm, and unevenness having a height (or depth) of 5 to 100 μm on the outer surface of the insulating body, or the insulating body and a seal are formed integrally.

DETAILED DESCRIPTION OF THE INVENTION

Figure 1:
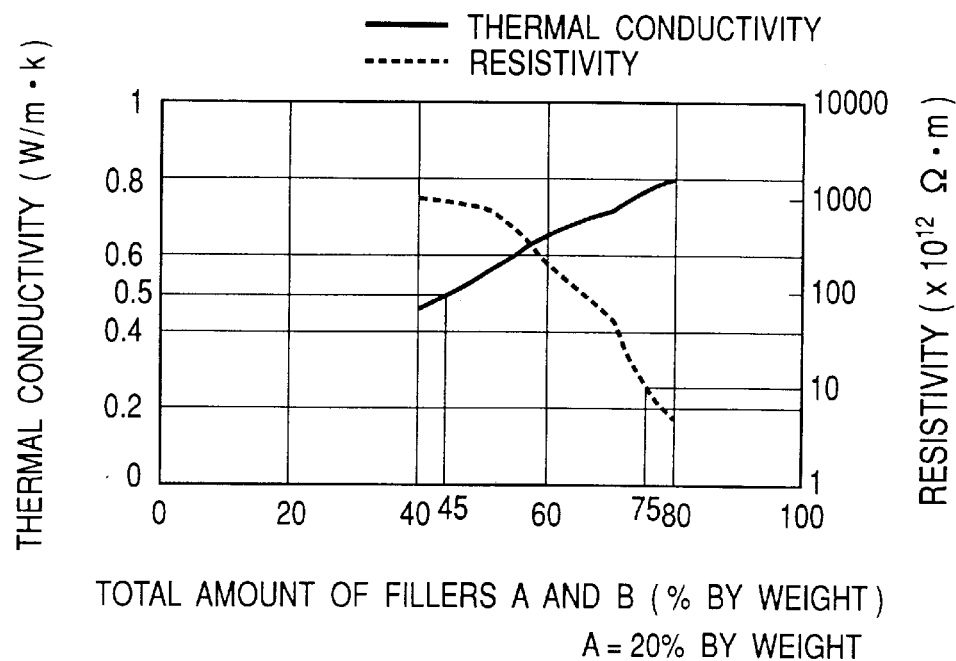
FIGS. 1 through 4 each is a graph showing the changes in thermal conductivity and resistivity with the proportion of fillers.

The first embodiment of the present invention will be described below.

The synthetic resin composition having a resistivity of not less than $1 \times 10^{13}$ Ω·cm and a thermal conductivity of not less than 0.5 W/m·K, which constitutes the insulating film, comprises (A) a fibrous filler having a thermal conductivity of less than 10 W/m·K and a resistivity of not less than $1 \times 10^3$ Ω·cm, which is contributory to reinforcement of the matrix resin, and (B) a magnetic filler having a saturation magnetization of not less than 20 emu/g and a resistivity of not less than $1 \times 10^3$ Ω·cm in a total amount (A+B) of 30 to 75% by weight. Details of the synthetic resin composition are described later along with the composition which constitutes the annular insulating member according to the third embodiment.

The second embodiment of the present invention will be described in more detail below.

The thermoplastic elastomer layer according to the second embodiment preferably has unevenness on at leaut part of its outer surface.

The thermoplastic elastomer layer preferably has a durometer hardness (A scale) of 60 to 90.

The thermoplastic elastomer layer preferably has a thickness of from 0.5 to 5 mm.

The unevenness of the thermoplastic elastomer layer preferably has a height (or depth) of 5 to 100 μm.

The thermoplastic elastomer layer preferably contains a thermally conductive filler having a thermal conductivity of 10 w/m·k or more and a resistivity of $1 \times 10^4$ Ω·cm or more.

According to the second embodiment, the thermoplastic elastomer layer formed on the outer peripheral portion of the outer race electrically insulates the outer race against the housing. Even if an axis voltage is produced in the inverter-driven motor, there is produced no potential difference between the inner and outer races, and no current flows between them. The inner and outer raceways or rolling elements can therefore be protected against electrolytic corrosion.

When the thermoplastic elastomer layer has a durometer hardness (A scale) of 60 to 90, it is softer and more deformable than general metallic thin layers or plastic layers so that the bearing can easily be fitted into a housing. After forcing the bearing into a housing (press-fit insert), the thermoplastic elastomer layer resists the housing, effectively functioning to prevent creep.

Unevenness on the surface of the thermoplastic elastomer layer reduces the contact area with the housing as compared with a flat layer, making the layer more deformable and further facilitating insertion into the housing.

Where the thermoplastic elastomer layer contains a thermally conductive filler, the heat generated is effectively dissipated to the housing without being accumulated in the layer. As a result, the elastomer can be prevented from thermal deterioration.

The thermoplastic elastomer which can be used in the rolling bearing of the present invention includes polyester elastomers, polyamide elastomers, polyurethane elastomers, polyolefin elastomrers, nitrile elastomers, acrylic elastomers, styrene elastomers, and dynamically crosalinked elastomers. From the standpoint of heat resistance, polyester elastomers are preferred.

Illustrative examples of useful thermoplastic elastomers include Milastomer (a registered trade name, produced by Mitsui Petrochemical Industries, Ltd.) as an olefin elastomer; Pelprene (a registered trade name, produced by Toyobo Co., Ltd.) and Hytrel (a registered trade name, produced by Du Pont-Toray Co., Ltd.) as a polyester elastomer; Pebax (a registered trade name, produced by Toray Industries, Inc.) and UBE Polyamide Elastomer (produced by Ube Industries, Ltd.) au a polyamide elastomer; Elastollan (a registered trade name, produced by Takeda Badische Urethane Kogyo K.K.) as a polyurethane slastomer; Miraprone (produced by Mitsubishi Kasei MKV K.K.) as a nitrile and acrylic elastomer; and Santoprene (a registered trade name, produced by A.E.S. Japan K.K.) as a dynamically crosslinked elastomer.

The thermoplastic elastomer preferably has a durometer hardness (A scale, hereinafter referred to as [$HD_A$]) of 60 to 90, particularly 70 to 85. If the hardness is less than 60 [$HD_A$], the layer is too soft and too deformable, tending to be crushed and pressed out of the edge of the bearing when press-fit inserted into a housing. In such a case, rigidity to radial load is deteriorated. If the hardness exceeds 90 [$HD_A$], deformability is insufficient for ease of insertion into a housing and creep resistance.

A thickness of about 0.5 to 5 mm for the thermoplastic elastomer layer suffices for electrical insulation and creep resistance. With a thickness less than 0.5 mm, the strength of the layer is reduced. If the thickness exceeds 5 mm, excess of the material therefor results in an increase of cost.

The height (or depth) of the surface unevenness of the thermoplastic elastomer layer is preferably 5 to 100 $\mu$m, particularly 10 to 50 $\mu$m, with considerations being given to parting properties from a mold, deformability, and creep resistance. A height less than 5 $\mu$m is not expected to make a sufficient contribution to creep prevention. A height more than 100 $\mu$m deteriorates parting properties from a mold, leading to reduced productivity.

The thermoplastic elastomer layer can be separately prepared by injection molding and fitted on an outer race with deformation. Alternatively, the thermoplastic elastomer layer can be formed by insert molding using a bearing body as a core. In the latter case, grooves (preferably dovetail grooves) are made on the outer peripheral portion of the outer race for preventing separation.

In order to enhance the joint strength between the outer race and the thermoplastic elastomer layer, an adhesive may be applied between the thermoplastic elastomer layer and the outer peripheral portion of the outer race. Elastic adhesives, such as epoxy adhesives, are suitable for offsetting the difference in linear expansion between the outer race body and the thermoplastic elastomer.

For the purpose of improving thermal conductivity of the thermoplastic elastomer layer, a thermally conductive filler having a thermal conductivity of 10 w/m·k or more and a resistivity of $1 \times 10^4$ $\Omega$·cm or more can be added to the elastomer. In this case, the heat generated on driving the motor is not accumulated in the elastomer layer and effectively escapes from the bearing to the housing, thereby suppressing thermal deterioration of the thermoplastic elastomer. The thermally conductive filler is preferably added in an amount of about 10 to 50% by weight. Various fillers can be used in an appropriate combination so that the thermoplastic elastomer layer may have a thermal conductivity of 0.5 w/m·k or more and a resistivity $1 \times 10^{13}$ $\Omega$·cm or more. If the content of the thermally conductive filler is less than 10% by weight, the effect of improving thermal conductivity is not so expected. If it exceeds 50% by weight, the moldability of the thermoplastic elastomer is reduced.

Examples of useful thermally conductive fillers are SiC whisker, $Al_2O_3$ whisker, fiber or particles, AlN particles, MgO particles, and BeO particles.

For the purpose of improving the strength of the thermoplastic elastomer layer, a reinforcing fiber, such as glass fiber, can be incorporated. The reinforcing fiber can be added in an amount of 30 to 65% by weight in total with the above-described thermally conductive filler. If the total content of the reinforcing fiber and the thermally conductive filler is less than 30% by weight, strength above a certain level cannot be obtained in good balance with thermal conductivity. If the total content exceeds 65% by weight, the moldability of the elastomer is deteriorated.

Next, the composition which can be used for the annular insulting member according to the third embodiment and the insulating film according to the first embodiment is described below.

The insulating film or annular insulating member is composed of a composition which contains (A) a fibrous filler having a thermal conductivity of less than 10 W/m·K and a resistivity of not less than $1 \times 10^3$ $\Omega$·cm, which is contributory to reinforcement of the matrix resin (hereinafter referred to as fibrous filler A or simply filler A), and (B) a magnetic filler having a saturation magnetization of not less than 20 emu/g and a resistivity of not less than $1 \times 10^3$ $\Omega$·cm (hereinafter referred to an magnetic filler B or simply filler B) in a total amount (A+B) of 30 to 75% by weight.

Filler B can be used in a proportion of 20 to 65% by weight based on the total weight of the composition.

Ferrite can be mentioned as an example of filler B.

Part or the whole of filler B may be replaced with a thermal conductivity-improving filler.

The thermal conductivity-improving filler includes (C) a nonmagnetic thermally conductive filler having a thermal conductivity of not less than 10 W/m·K and a resistivity of not less than $1 \times 10^3$ $\Omega$·cm (hereinafter referred to as nonmagnetic thermally conductive filler C or simply filler C).

Filler C includes particles, fibers or whiskers of inorganic compounds.

Resins and fibrous materials, such as glass fiber, generally have a small thermal conductivity. Accordingly, an insulating film formed of a resin composition consisting solely of a resin and a fibrous material has a small thermal conductivity. In addition, since fibrous materials such as glass fiber have no magnetism, they are not linked together through magnetic attraction in the resin matrix. Therefore, in order to make the individual fibers contact with each other so as to obtain an increased thermal conductivity, glass fiber should be used in a considerably large proportion, which results in appreciable reductions in moldability and mechanical strength, such as weld strength, failing to form an insulating film (annular insulating member) having sufficient properties for use on a bearing.

In the present invention, electrically insulating filler B comprising magnetic particles having a saturation magnetization of not less than 20 emu/g and a resistivity of not less than $1 \times 10^3$ $\Omega$·cm is added to the resin. The magnetic particles added attract each other to come into contact with each other thereby to increase the thermal conductivity of the insulating film or annular insulating member and to improve heat dissipation properties. There is thus obtained an insulating film excellent in heat resistance, insulating properties, heat dissipation properties as well as creep resistance.

In another preferred embodiment, a part of or the whole of fibrous filler A and magnetic filler B is replaced with filler C having a thermal conductivity of not less than 10 W/m·K and a resistivity of not less than $1 \times 10^3$ $\Omega$·cm. Filler C, which is added as a thermal conductivity-improving filler, can be used similarly to reinforcing fillers, such as glass fiber. Filler C, which is added as a thermal conductivity-improving filler, can be used similarly to reinforcing fillers, such as glass fiber. Filler C brings about improved thermal conductivity without reducing the strength of the resin, as long as it has a fibrous or whisker form. Examples of such a embodiment include the synthetic resin composition comprising a filler C having a thermal conductivity of not less than 10 W/m·K and a resistivity of not less than $1\times10^3$ Ω·cm and being a fibrous or whisker form and optionally a magnetic filler B, preferably in a total amount of filler C and filler B (optionally added) of 30 to 75% by weight based on the resin composition.

The matrix resin for use preferably includes a PPS resin and aromatic or aliphatic polyamide resins, such as 4.6 nylon. A PPS resin has low water-absorbing properties and satisfactory moldability and can therefore be injection molded to provide an insulating film or annular insulating member having low water-absorbing properties and excellent dimensional stability at low cost. The aromatic polyamide resins are preferred for their high melting point and high strength. They retain insulating properties in a high temperature reaching 120° C. at the time of high-speed revolution of a bearing. The aliphatic polyamide resins, e.g., 4.6 nylon, are also suited as an insulating film or annular insulating member because of their satisfactory insulating properties.

Since these resins cannot perform by themselves all the functions required of an insulating film for an anti-electrolytic corrosion rolling bearing, they should be used in combination with the following various additives.

Filler A for reinforcement of the resin is added chiefly for the improvement in creep resistance and for the maintenance of the electrical insulating properties of the insulating film or annular insulating member. Filler A preferably has as high insulating properties as possible, usually having a resistivity of not less than $1\times10^3$ Ω·cm, preferably not less than $1\times10^4$ Ω·cm, and preferably has a high thermal conductivity. Examples of suitable fillers A include glass fiber (GF), whiskers of potassium titanate, e.g., potassium hexatitanate ($K_2O.6TiO_2$), potassium octatitanate ($X_2O.8TiO_2$), aluminum borate whiskers ($9Al_2O_3.2B_2O_3$), calcium carbonate whiskers (aragonite, CaCOs), and basic magnesium sulfate whiskers ($XgSO_4.5Mg(OH)_2.3H_2O$); and aramid fiber. The resistivity of these fillers A are shown in Table 1 below.

is a possibility that the moldability is deteriorated. If it is less than 10%, there is a possibility that the creep resistance is deteriorated.

Magnetic filler B is used for the maintenance of electrical insulating properties and for the improvement in thermal conductivity of the insulating film or annular insulating member. The thermal conductivity of filler B is preferably as high as possible and should be at least on the same level as glass fiber, i.e., ranging from 5 to 10 W/m·K. Filler B preferably has as high electrical insulating properties as possible, having a resistivity of not less than $1\times10^3$ Ω·cm, preferably not less than $1\times10^4$ Ω·cm. Filler B has a saturation magnetization of not less than 20 emu/g, preferably not less than 50 emu/g, for exerting a sufficient magnetic attraction force. If the saturation magnetization is less than 20 emu/g, the magnetic attraction is too small to obtain a desired level of improvement in thermal conductivity.

Magnetic fillers satisfying the above requirements include magnetic granulate powders such as magnesium ferrite ($MgFe_2O_4$), manganese ferrite ($MnFe_2O_4$), magnetite ($Fe_3O_4$), cobalt ferrite ($CoFe_2O_4$), nickel ferrite ($NiFe_2O_4$), copper ferrite ($CuFe_2O_4$), and maghemite ($\gamma\text{-}Fe_2O_3$). The saturation magnetization and resistivity of these fillers B are shown in Table 2 below.

TABLE 2

|  | $MgFe_2O_4$ | $MnFe_2O_4$ | $Fe_3O_4$ | $CoFe_2O_4$ | $NiFe_2O_4$ | $CuFe_2O_4$ | $\gamma\text{-}Fe_2O_3$ |
|---|---|---|---|---|---|---|---|
| Saturation Magnetization (room temp.) (emu/g) | 31 | 80 | 92 | 80 | 50 | 25 | 65 |
| Resistivity (Ω · cm) | $1\times10^7$ | $1\times10^4$ | $1\times10^3$ | $1\times10^7$ | $1\times10^7$ | $1\times10^5$ | $1\times10^4$ to $1\times10^5$ |

Filler B is added generally in an amount of from 20 to 65% by weight, preferably from 25 to 50% by weight, more preferably from 25 to 55% by weight, based on the total weight of the synthetic resin composition constituting the insulating film or annular insulating member. If the amount of filler B exceeds 65%, it is difficult to secure satisfactory creep resistance and moldability. If it is less than 20%, an improvement on thermal conductivity cannot be expected, and the resulting insulating film does not satisfy all the three requirements, i.e., electrical insulating properties, thermal conductivity and creep resistance.

Filler A and filler B are preferably used in a total amount of 30 to 75% by weight based on the total weight of the insulating film. If the total amount exceeds 75%, the shortage of the matrix resin will incur a reduction in flowability on molding only to produce an insulating film with poor surface properties and reduced weld strength. If the total

TABLE 1

|  | (GF) E glass | $K_2O.6TiO_2$ | $K_2O.8TiO_2$ | $9Al_2O_3.2B_2O_3$ | $CaCO_3$ | $MgSO_4.5Mg(OH)_2.3H_2O$ |
|---|---|---|---|---|---|---|
| Resistivity (Ω · cm) | $1\times10^{15}$ | $3.3\times10^{15}$ | $3.3\times10^{15}$ | $1\times10^{13}$ | $3\times10^8$ | $2.4\times10^{14}$ |

Filler A for the improvement on creep resistance is used generally in an amount of 10 to 55% by weight, preferably 20 to 40% by weight, based on the total weight of the insulating film. If the amount of filler A exceeds 55%, there amount is less than 30%, shortage of both fillers A and B makes it difficult to satisfy both the requirements of thermal conductivity and creep resistance.

Nonmagnetic thermally conductive filler C is used for the improvements in electrical insulation and thermal conduction of the insulating film or annular insulating member similarly to filler B. Unlike magnetic filler B, particles of nonmagnetic filler C are not linked together so that the individual particles of filler C should have a high thermal conductivity, i.e., not less than 10 W/m·K, preferably not less than 20 W/m·K. Filler C preferably has as high electrical insulating properties as possible, usually having a resistivity of $1\times10^3$ Ω·cm or higher, preferably $1\times10^4$ Ω·cm or higher.

Examples of fillers C satisfying the above requirements include powder, fiber or whiskers of silicon carbide (SiC), aluminum nitride (AlN), beryllia (BeO), boron nitride (BN), alumina ($Al_2O_3$), magnesia (MgO), etc. The thermal conductivity and resistivity of these fillers C are shown in Table 3 below in comparison with those of copper (Cu) and glass fiber (E glass). Of these fillers, SiC and $Al_2O_3$ include fibers and whiskers (C-1), while the others are granulates (C-2). Therefore, where a further improvement on creep resistance is desired, it is preferable to replace glass fiber as filler A with SiC or $Al_2O_3$ fibers or whiskers (C-1) thereby to obtain further improved creep resistance as well as improved thermal conductivity.

TABLE 3

|  | SiC | AlN | BeO | $Al_2O_3$ | BN | MgO | Cu | E Glass |
|---|---|---|---|---|---|---|---|---|
| Thermal Conductivity (W/m · K) | 270 | 70–260 | 159 | 17–31 | 57 | 42 | 401 | 1.04 |
| Resistivity (Ω · cm) | $1 \times 10^{10}$–$10^{13}$ | $1 \times 10^{11}$–$10^{14}$ | $>1 \times 10^{14}$ | $>1 \times 10^{14}$ | $>1 \times 10^{14}$ | $>1 \times 10^{14}$ | $1.72 \times 10^{-6}$ | $1 \times 10^{15}$ |

As stated above, filler C can be used as a part off or in place of, filler B. In this case, filler C or a combination of fillers B and C is used in an amount of 20 to 65% by weight, preferably 25 to 50% by weight, based on the total weight of the insulating film. If the amount of filler C alone or a combination of fillers B and C exceeds 65%, satisfactory moldability is hard to secure. If it is less than 20%, no improvement in creep resistance and thermal conductivity can be expected, failing to provide an insulating film satisfying the three requirements, i.e., electrical insulating properties, thermal conductivity, and creep resistance. From the economical consideration, because filler B is less expensive than filler C, it is more advantageous to use filler B or a combination of fillers B and C than to use filler C alone.

The nonmagnetic thermally conductive filler (C-1) can be used in place of at least part of the magnetic filler (B). The combination of the nonmagnetic thermally conductive filler (C-1) and the magnetic filler (B) is used in a total amount of 30 to 75% by weight based on the total synthetic resin composition. When the former is used in place of the whole of the latter, (C-1) is used in an amount of 20 to 75% by weight, preferably 25 to 50% by weight, based on the total resin composition. If it exceeds 75% by weight, the resin composition is difficult to mold. If it is lose than 20% by weight, the resulting annular insulating member does not have a thermal conductivity of 0.5 W/m·k or higher, failing to meet the expectation of improvements in creep resistance and thermal conduction. That is, the insulating film or annular insulating member cannot be expected to produce the effects in improving electrical insulating properties, thermal conductivity, and creep resistance simultaneously. From the standpoint of cost, because the magnetic filler (B) is less expensive than the nonmagnetic thermally conductive filler (C-1), it is economically advantageous to use the nonmagnetic filler (B) alone or in combination with the nonmagnetic thermally conductive filler (C-1).

The amount of each filler, when used individually, to be incorporated into the resin composition is shown in Table 4.

TABLE 4

| Filler | Shape | Amount (wt %) |
|---|---|---|
| A (reinforcing fiber) | fibrous or whisker | 20 to 40 (+B/C-2) |
| B (magnetic filler) | particulate | 25 to 55 |
| C-1 (nonmagnetic thermally conductive filler) | fibrous or whisker | 20 to 75 |
| C-2 (nonmagnetic thermally conductive filler) | particulate | 25 to 55 |

Note that the amount of (A) or (B), when used in combination with (C-1), is 0 to 40% by weight or 0 to 55% by weight, respectively, as hereinafter described.

These fillers can be used in combination. The following combinations can be used in the total amount shown bared on the total synthetic resin composition.

(1) A+B: 45 to 75 wt %

(2) A+C-2: 45 to 75 wt %

(3) B+C-1: 30 to 75 wt %

(4) A+C-1: 45 to 75 wt %

(5) A+B+C: 45 to 75 wt %

In any combination, if the total amount of the fillers is less than the respective lower limit, the thermal conductivity of the insulating film or annular insulating member does not reach 0.5 W/m·k. If the total amount exceeds the respective upper limit, the moldability of the resin composition is deteriorated.

The grounds for the limitations of the total amounts of the fillers are as follows.

(1) Combination of fibrous filler (A) and magnetic filler (B):

Table 5 below shows the results of measurement of the thermal conductivity and resistivity of an insulating film or annular insulating member containing fillers (A)+(B) while varying the proportion of magnetic filler (B) ($MnFe_2O_4$) with the proportion of fibrous filler (A) (glass fiber) being fixed at 20% by weight.

TABLE 5

| Total Amount of (A) + (B) (wt %) | Thermal Conductivity (W/m · k) | Resistivity ($\times 10^{12}$ Ω · cm) |
|---|---|---|
| 40 | 0.45 | 1000 |
| 50 | 0.54 | 800 |
| 55 | 0.6 | 500 |
| 60 | 0.65 | 200 |
| 65 | 0.69 | 100 |
| 70 | 0.72 | 50 |

TABLE 5-continued

| Total Amount of (A) + (B) (wt %) | Thermal Conductivity (W/m · k) | Resistivity (×10¹² Ω · cm) |
|---|---|---|
| 75 | 0.77 | 10 |
| 80 | 0.8 | 5 |

The results of Table 5 are plotted in FIG. 1. As is apparent from the plots of FIG. 1, it is particularly preferred that filler A and filler B are used in a total amount of from 45 to 75% by weight, based on the total weight of the insulation film. If it exceeds 75% by weight, the insulating film or insulating member has a resistivity less than $1 \times 10^{13}$ Ω·cm. Further, the shortage of the matrix resin results in sufficient flowability in molding. It follows that the resulting insulating film or annular insulating member has a poor surface condition and a reduced weld strength. If the total amount is less than 30%, shortage of both fillers A and B makes it difficult to satisfy both the requirements of thermal conductivity and creep resistance. If the total amount is than 45% by weight, on the other hand, the absolute minimum of neither fibrous filler (A) nor magnetic filler (B) can be secured, resulting in difficulty in obtaining good balance between thermal conductivity and creep resistance and a failure of obtaining an annular insulating member having a thermal conductivity of 0.5 W/m·k or more. For securing further improved thermal conductivity and creep resistance, a still preferred range of the total amount of (A)+(B) is 50 to 75% by wiegth.

(2) Combination of fibrous filler (A) and particulate nonmanetic thermally conductive filler (C-2):

Table 6 shows the results of measurement of the thermal conductivity and resistivity of an insulating film or annular insulating member containing fillers (A)+(C-2) while varying the proportion of the nonmagnetic filler (C-2) ($Al_2O_3$) with the proportion of the fibrous filler (A) (glass fiber) being fixed at 20% wieght.

TABLE 6

| Total Amount of (A) + (C-2) (wt %) | Thermal Conductivity (W/m · k) | Resistivity (×10¹² Ω · cm) |
|---|---|---|
| 40 | 0.43 | 6000 |
| 50 | 0.54 | 4000 |
| 55 | 0.69 | 3000 |
| 60 | 0.75 | 1500 |
| 65 | 0.79 | 1000 |
| 70 | 0.82 | 800 |
| 75 | 0.83 | 700 |
| 80 | 0.84 | 650 |

Figure 2:
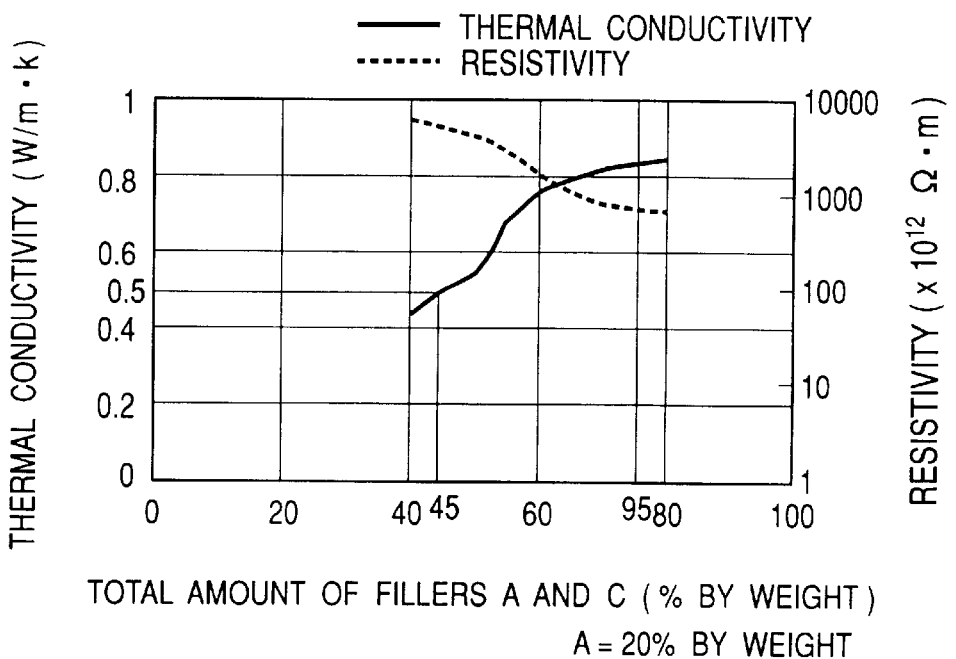

The results of Table 6 are plotted in FIG. 2. As is apparent from the plots of FIG. 2, the total amount of (A) and (C-2) preferably ranges from 45 to 75% by weight. If it exceed 75% by weight, although the resistivity is still high, the shortage of the matrix resin results in poor moldability. If it is less than 45% by weight, a thermal conductivity of 0.5 W/m·k or more cannot be obtained.

(3) Combination of magnetic filler (B) and fibrous or whisker nonmagnetic thermally conductive filler (C-1):

Table 7 below shows the results of measurement of the thermal conductivity and resistivity of an insulating film or annular insulating member containing fillers (B)+(C-1) while varying the proportion of the nonmagnetic thermally conductive filler (C-1) ($Al_2O_3$ fiber) with the proportion of the magnetic filler (B) ($MnFe_2O_4$) being fixed at 20% by weight.

TABLE 7

| Total Amount of (B) + (C-1) (wt %) | Thermal Conductivity (W/m · k) | Resistivity (×10¹² Ω · cm) |
|---|---|---|
| 30 | 0.5 | 1000 |
| 40 | 0.55 | 900 |
| 50 | 0.65 | 800 |
| 55 | 0.75 | 600 |
| 60 | 0.79 | 500 |
| 70 | 0.82 | 450 |
| 80 | 0.86 | 400 |

Figure 3:
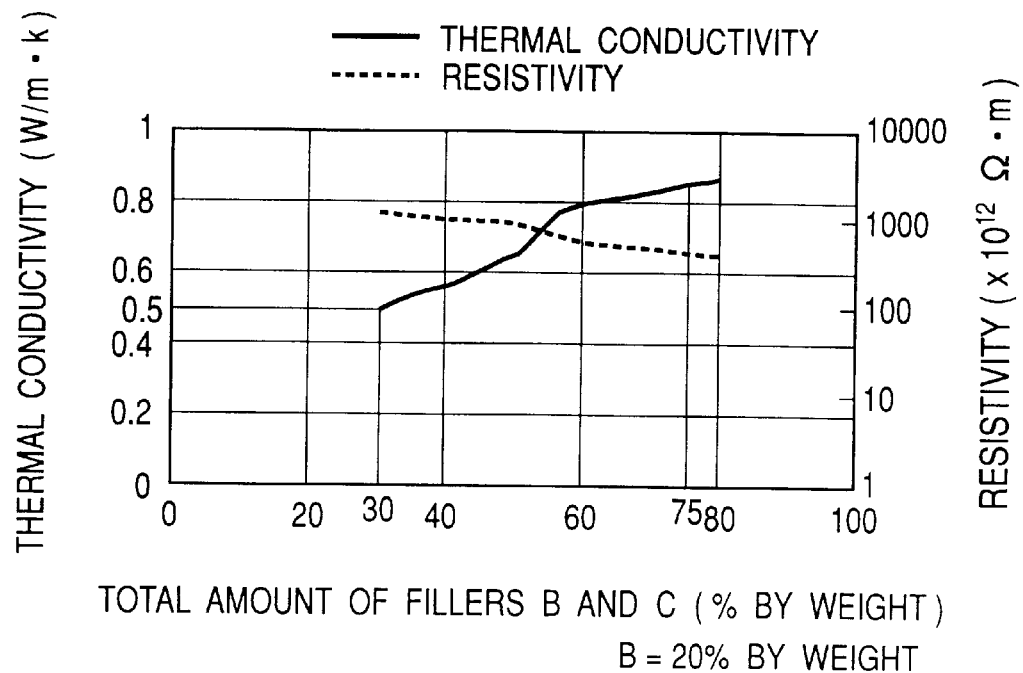

The results of Table 7 are plotted in FIG. 3. As is apparent from the plots of FIG. 3, the total amount of (B) and (C-1) preferably ranges from 30 to 75% by weight. If it exceeds 75% by weight, although the resistivity is still high, the shortage of the matrix resin results in poor moldability. If it is less than 30% by weight, a thermal conductivity of 0.5 W/m·k or more cannot be obtained.

Table 8 shows the results of measurement of the thermal conductivity and resistivity of an insulating film or annular insulating member containing the whisker nonmagnetic thermally conductive filler (C-1) (Si whisker) alone in a varying proportion.

TABLE 8

| Amount of (C-1) (wt %) | Thermal Conductivity (W/m · k) | Resistivity (×10¹² Ω · cm) |
|---|---|---|
| 20 | 0.48 | 3000 |
| 30 | 0.55 | 2000 |
| 40 | 0.65 | 1000 |
| 50 | 0.73 | 800 |
| 55 | 0.8 | 600 |
| 60 | 0.86 | 500 |
| 70 | 0.9 | 450 |
| 80 | 0.93 | 400 |

Figure 4:
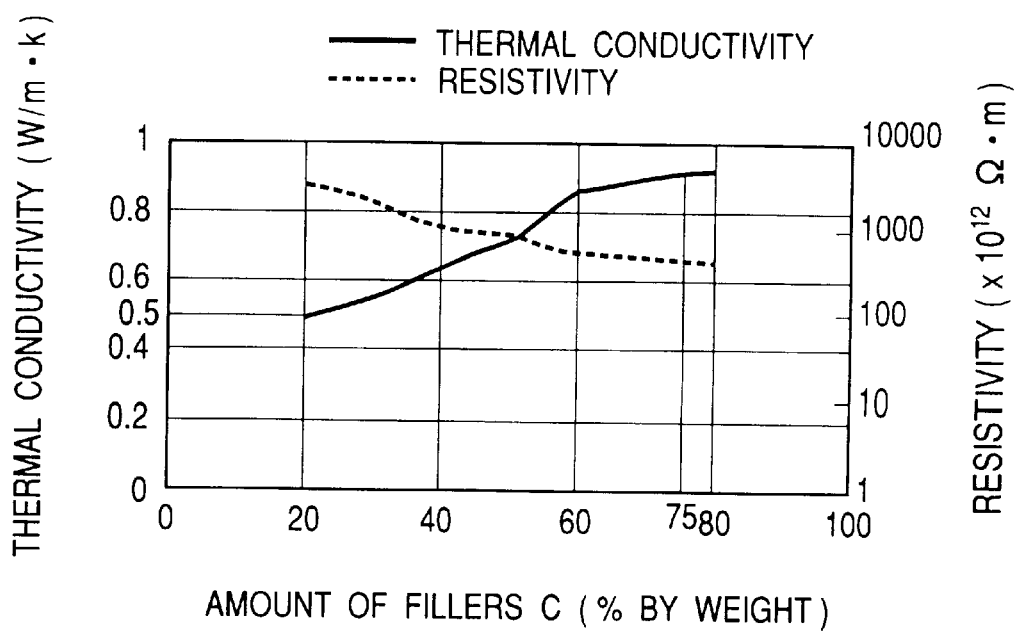

The results of Table 8 are plotted in FIG. 4. As is apparent from the plots of FIG. 4, the amount of (C-1) used alone preferably ranges from 20 to 75% by weight. If it exceeds 75% by weight, although the resistivity is still high, the shortage of the matrix resin results in poor moldability. If it is less than 20% by weight, a thermal conductivity of 0.5 W/m·k or more cannot be obtained with difficulty in obtaining thermal conductivity and creep resistance in good balance.

(4) Combination of fibrous filler (A) and whisker nonmagnetic thermally conductive filler (C-1):

The thermal conductivity and volume resistance of an insulating film or annular insulating member containing a combination of fillers (A) and (C-1) were measured while varying their total proportion in the resin composition. From the results obtained, while not shown, it was ascertained that the total amount of (A) and (C-1) preferably ranges from 45 to 75% by weight. If it exceeds 75% by weight, although the resistivity is still high, the shortage of the matrix resin results in poor moldability. If it is less than 45% by weight, a thermal conductivity of 0.5 W/m·k or more cannot be obtained.

(5) Combination of fibrous filler (A), magnetic filler (B) and nonmagnetic thermally conductive filler (C)

The total amount of fillers A, B, and C is generally from 30 to 75% by weight, preferably 45 to 75% by weight based on the total weight of the insulating film. If it exceeds 75%, the shortage of the matrix resin will incur a reduction in flowability on molding only to produce an insulating film with poor surface properties and reduced weld strength. If the total amount is less than 30%, the insulating film or annular insulating member having a thermal conductivity of 0.5 w/m·k or more can not be obtained, and shortage of each of fillers A, B, and C makes it difficult to satisfy both the requirements of thermal conductivity and creep resistance. For securing further improvements in thermal conductivity and creep resistance, a still preferred total amount of fillers A, B, and C ranges from 50 to 75% by weight.

The proportion of each filler in the total fillers A, B and C should be determined so as to secure the following physical properties necessary as an insulating film or annular insulating member which prevents the rolling bearing from being subjected to electrolytic corrosion.

Thermal conductivity: not less than 0.5 W/m·K

Resistivity: not loss than $1 \times 10^{13}$ Ω·cm

Weld strength: not less than 70 MPa

Izod impact strength: 2 kJ/m$^2$ or more

Creep resistance (in terms of rate of dimensional change under conditions of 120° C. and planar pressure of 2.9 kg/mm$^2 \times 100$ hr): not more than −2.5%

An insulating film having an Izod impact strength of 2 kJ/m$^2$ or more, preferably 5 kJ/m$^2$ or more, exhibits satisfactory strength on falling, making handling of the bearing easier. When a bearing has an insulating film having a weld strength of 70 MPa or more and an Izod impact strength of 2 kJ/m$^2$ or more, damage of the insulating film in fitting the bearing in a housing can be prevented.

If desired, the resin composition containing fillers A and B and/or C may further contain a parting agent, a coupling agent (e.g., a silane coupling agent) for strength improvement. A coupling agent-treated fibrous material or filler may be used.

The second embodiment of the present invention is illustrated by referring to the accompanying drawings.

Figure 5:
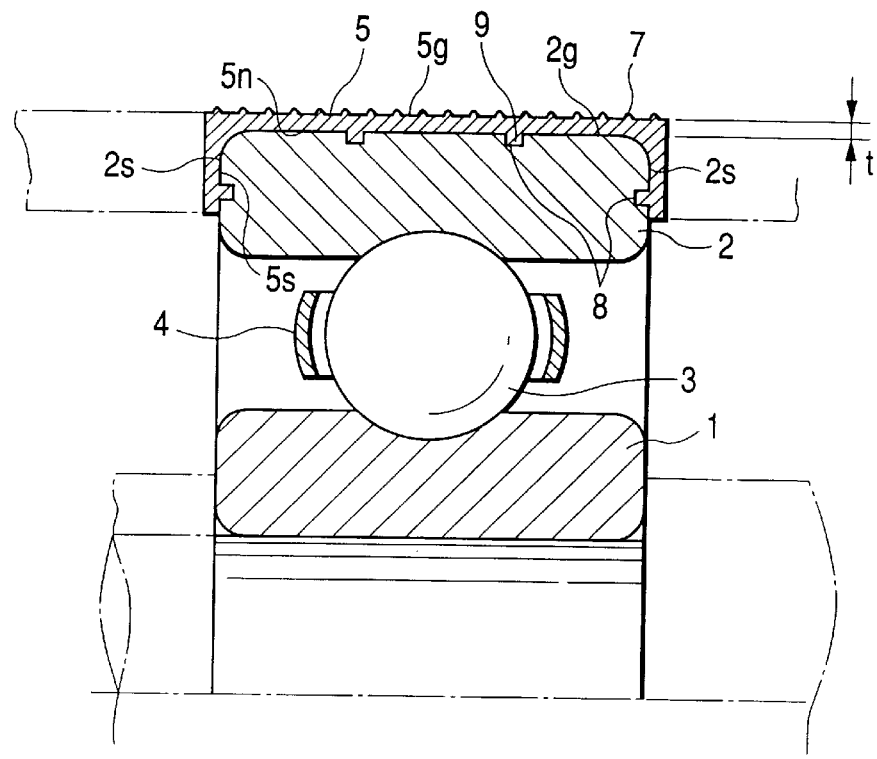
FIG. 5 is a half cross section of a first example of the rolling bearing according to the present invention.

FIG. 5 is a half cross section of a first example of the rolling bearing according to the second embodiment. In this example the present invention is applied to a deep groove ball bearing comprising an inner race 1 that is fitted on the rotating axis of a fan motor, an outer race 2 that is fitted into a housing, a ball 3 (rolling element) that is held between the inner race 1 and the outer race 2, and a cage 4 that holds the ball 3. Almost the entire surface of the outer peripheral portion of the outer race 2, i.e., the outer periphery surface 2g and both side surfaces 2s, 2s, is covered with a film of a thermoplastic elastomer layer 5.

Figure 6:
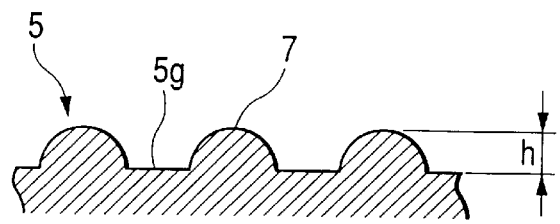
FIG. 6 is an enlarged partial cross section of the surface of the thermoplastic elastomer layer shown in FIG. 5.

The thermoplastic elastomer layer 5 has a thickness t of 1.5 mm in its thinnest part. A number of annular ridges 7 having a half-round section and a height h of about 50 µm, the enlarged cross section of which is shown in FIG. 6, are provided on the outer periphery surface of the thermoplastic elastomer layer 5 along the circumferential direction. Further, annular projections 8 having a rectangular section are provided on the inner periphery surface 5n and the inner side surfaces of the thermoplastic elastomer layer 5 along the circumferential direction. The projections 8 are mating with annular grooves 9 having a rectangular section which have previously been formed on the outer periphery surface 2g and both side surfaces 2s, 2s of the outer race 2 along the circumferential direction so that the projections 8 are fitted into the grooves 9 to prevent separation of the thermoplastic elastomer layer 5 from the outer race 2.

Figure 7:
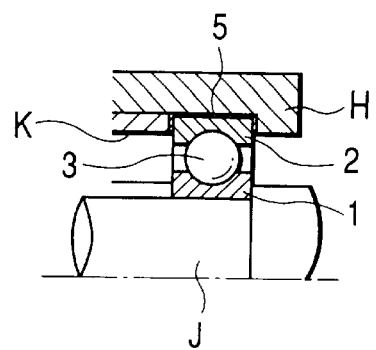
FIG. 7 schematically illustrates an example of the fit of the rolling bearing of FIG. 5 to a fan motor.

The thermoplastic elastomer layer 5 was prepared by injection molding of, e.g., Perprene (registered trade name) P-30B (polyester elastomer), using a prescribed mold. The thermoplastic elastomer layer 5 had a hardness of 71 [HD$_A$], a thermal conductivity of 0.22 w/m·k, and a resistivity of $1 \times 10^{12}$ Ω·cm. In this example, a room temperature curing epoxy type elastic adhesive EP-001 was previously applied to the outer peripheral portion of the outer race 2, and the injection molded thermoplastic elastomer layer 5 is fitted over the outer peripheral portion of the outer race 2 while being deformed, followed by allowing them to stand till complete adhesion.

Where the deep groove ball bearing is used at the fixed end of a fan motor as shown in FIG. 7, the inner race 1 is tight fitted over a rotating axis J of the fan motor, while the outer race 2 is fitted into a housing H with a preload applied by means of a spacer K. The outer race 2 is fitted to the inner side of the housing H via the thermoplastic elastomer layer 5. Thus, the outer periphery surface 2g of the outer race 2 is electrically insulated from the housing H by the thermoplastic elastomer layer 5 formed on the peripheral portion of the outer race 2. Similarly, electrical insulation is achieved between one of the outer sides 2s of the outer race 2 and the housing H and between the other outer side 2s and the spacer K, a part of the housing, by the thermoplastic elastomer layer 5. Accordingly, if an inverter-driven fan motor generates an axial voltage, no potential difference is produced between the inner race 1 and the outer race 2. That is, an electrical current is prevented from flowing between the inner and outer races, and the raceways of the inner race 1 and the outer race 2 and the rolling surface of the ball 3 can be protected against electrolytic corrosion.

As compared with a conventional insulating film made of plastics or ceramics, the thermoplastic elastomer layer 5 has a hardness of 71 [HD$_A$], being soft and easy to deform in nature of its material. In addition, because the outer periphery surface 5g of the thermoplastic elastomer layer 5 has unevenness to make the contact area with the housing smaller, the thermoplastic elastomer layer 5 is deformable in the nature of its form. Therefore, the outer race 2 with the thermoplastic elastomer layer 5 can easily be inserted into the housing H. After being forced into the housing H, the thermoplastic elastomer layer 5 then resists deformation. In other words, the bearing of this example achieves anti-electrolytic corrosion while maintaining ease in fitting and preventing creep.

Figure 8:
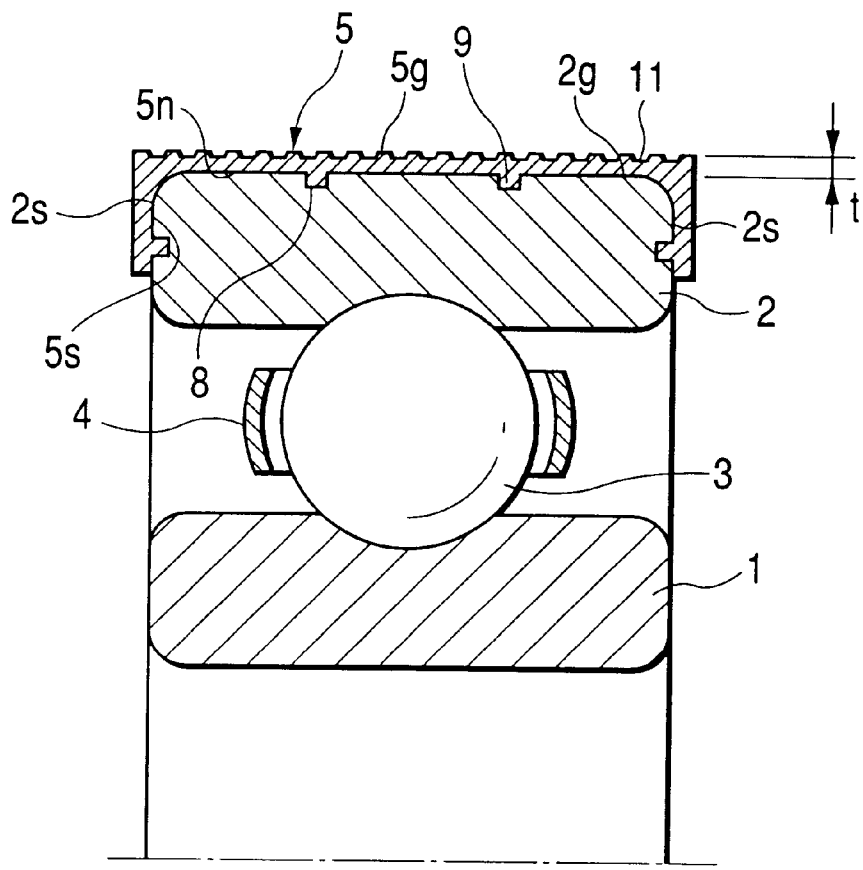
FIG. 8 is a half cross section of a second example of the rolling bearing according to the present invention.
Figure 9:
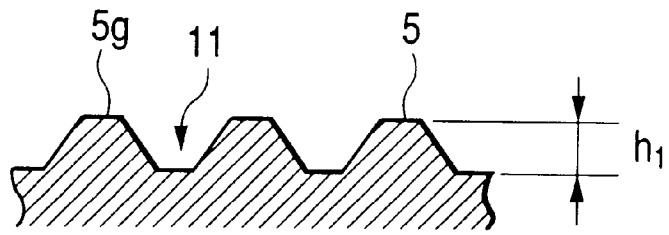
FIG. 9 is an enlarged partial cross section of the surface of the thermoplastic elastomer layer shown in FIG. 8.

A second example of the second embodiment is shown in FIGS. 8 and 9. The differences of this second example from the first one reside in the material of the thermoplastic elastomer layer 5 covering the peripheral portion of the outer race 2 and the surface profile of the outer periphery surface 5g of the thermoplastic elastomer layer 5. That is, the thermoplastic elastomer layer 5 of the second example was made of Pebax (a registered trade name) 2533SA (produced by Toray Industries, Inc.) which is a polyamide elastomer (more particularly polyamide-polyether elastomer) having a hardness of 75 [HD$_A$]. The thermoplastic elautomer layer 5 had a hardness of 75 [HD$_A$], a thermal conductivity of 0.26 w/m·k, and a resistivity of $10^{14}$ to $10^{15}$ Ω·cm. The methods for molding the thermoplastic elastomer and fitting the thermoplastic elastomer layer 5 on the outer race 2 are the same as in the first example. The surface profile of the periphery surface 5g is shown in FIG. 9, in which a number of annular projections 11** having a trapezoidal section having a height h*l* of about 30 µm are provided in the circumferential direction in place of the projections 7 having a half-round section as used in the first example.

The other structural particulars and the effects of action are the same as in the first example.

Figure 10:
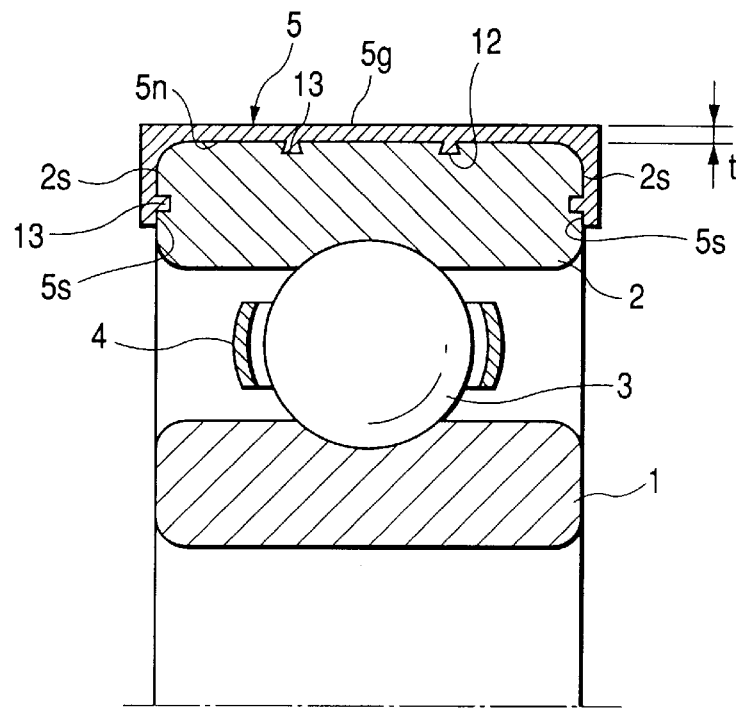
FIG. 10 is a half cross section of a third example of the rolling bearing according to the present invention.
Figure 11:
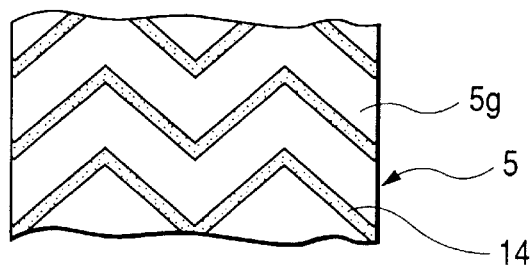
FIG. 11 is an enlarged partial plan of the surface of the thermoplastic elastomer layer shown in FIG. 10.

A third example of the third embodiment is shown in FIGS. 10 and 11. The differences of the third example from the first and second ones reside in the material of the thermoplastic elastomer layer 5, the structure for fitting onto the outer race, and the surface profile of the outer periphery surface 5g of the thermoplastic elastomer layer 5. That is, the thermoplastic elastomer layer 5 of this example was made of a compound comprising the same polyester elastomer as used in the first example, i.e., Perprene P-30B, and 40% by weight of SiC whisker as a reinforcing thermally conductive filler. As shown in FIG. 10, annular grooves 12 having an inverted trapezoidal section (dovetail grooves) are formed on the periphery surface 2g and both sides 2s of the outer race in the circumferential direction. Insert molding of the thermoplastic elastomer is carried out using the grooved outer race 2 as a core to form the thermoplastic elastomer layer 5. The thus formed thermoplastic elastomer layer 5 is prevented from coming off the outer race 2 by projections 13 formed on the inner periphery surface 5n and the inner side surfaces 5s thereof, which are mating with the dovetail grooves 12. The thermoplastic elastomer layer 5 has a thickness t of 1.0 mm exclusive of the projections 13.

As shown in FIG. 11, the outer periphery surface of the thermoplastic elastomer layer 5 has grooves 14 having a depth of 50 μm in a herringbone pattern continuous in the width direction of the outer race 2. The thermoplastic elastomer layer 5 of the third example had a hardness of 75 [$HD_A$], a thermal conductivity of 0.6 w/m·k, and a resistivity of $1 \times 10^{15}$ Ω·cm.

The other structural particulars and the effects of action are the same as in the first example.

Figure 12:
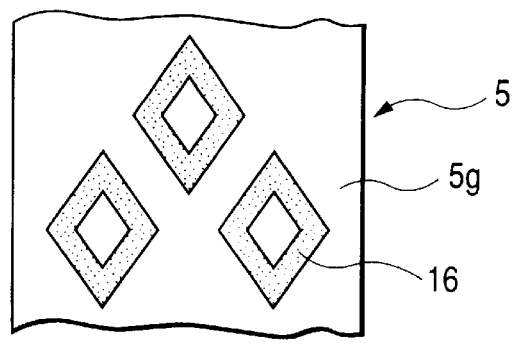
FIG. 12 is an enlarged partial plan of the surface of a thermoplastic elastomer layer of a fourth example of the rolling bearing according to the present invention.

A fourth example of the second embodiment is illustrated in FIG. 12. The thermoplastic elastomer layer 5 of this example is made of a compound comprising a polyester elastomer, Perprene P-30B, 30% by weight of AlN powder as a thermally conductive filler, and 20% by weight of glass fiber (having been treated with a silane coupling agent) as a reinforcement.

The structure for fitting the thermoplastic elastomer layer 5 onto the outer race 2 is the same as in FIG. 10.

On the outer periphery surface 5g of the thermoplastic elastomer layer 5 are made 50 μm deep grooves 16 each making a rhombic shape as shown in FIG. 12. The thermoplastic elastomer layer 5 of the fourth example had a hardness of 77 [$HD_A$], a thermal conductivity of 0.62 w/m·k, and a resistivity of $9 \times 10^{14}$ Ω·cm.

The other structural particulars and the effects of action are the same as in the first example.

Figure 13:
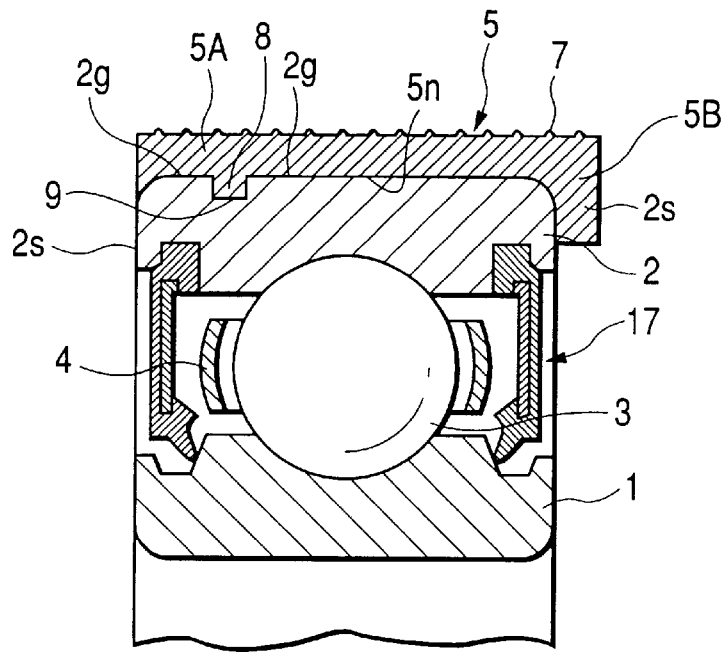
FIG. 13 is a half cross section of a fifth example of the rolling bearing according to the present invention.

A fifth example of the second embodiment is shown in FIG. 13. The bearing of this type is suitably applied to cases in which the peripheral portion (outer periphery surface and one side) of the outer race 2 and a housing are electrically connected by, for example, a spring for applying a preload to one side 2s of the outer race 2. The thermoplastic elastomer layer 5 is made up of a portion 5A that covers the outer periphery surface 2g of the outer race 2 and a portion 5B that is perpendicular to the portion 5A to cover one side 2s of the outer race 2, having a nearly L-shaped section. The outer periphery surface 2g and one of the sides 2s of the outer race 2 of the rolling bearing (a closed bearing having a seal 17 in this particular example) are covered with the thermoplastic elastomer layer 5. The side 2s to be covered is the one that would be electrically connected without the thermoplastic elastomer layer 5.

The outer periphery surface of the thermoplastic elastomer layer 5 has a number of annular ridges 7 having a half-round section in its circumferential direction in the same manner as shown in FIGS. 5 and 6.

The injection molded thermoplastic elastomer layer 5 having an L-shaped section has an annular projection 8 having a rectangular section on the inner surface 5n near the non-covered side 2s of the outer race 2 in the circumferential direction thereof. The outer periphery surface 2g of the outer race 2 has a groove 9 having a rectangular section on the position mating the projection 8 along its circumferential direction.

The thermoplastic elastomer layer 5 can be fitted onto the outer race 2 in the same manner as in the first example. That is, an elastic adhesive is previously applied to the surface of the outer race 2 to be covered, and the thermoplastic elastomer layer 5 is adhered to the outer race 2 with the projection 8 of the former fitted into the groove 9 of the latter.

When fixed into a fan motor, the bearing of the fifth example is electrically insulated against the housing H by the portion 5A covering the outer periphery surface 2g of the outer race 2 and also against a preloading member by the portion 5B covering one side 2s of the outer race 2. Accordingly, if an inverter-driven fan motor generates an axial voltage, no potential difference is produced between the inner race 1 and the outer race 2. That is, an electrical current is prevented from flowing between the inner and outer races, and the inner and outer raceways and the rolling surface of the ball 3 can be protected against electrolytic corrosion. The other structural particulars and the effects of action are the same as in the first example.

Figure 14:
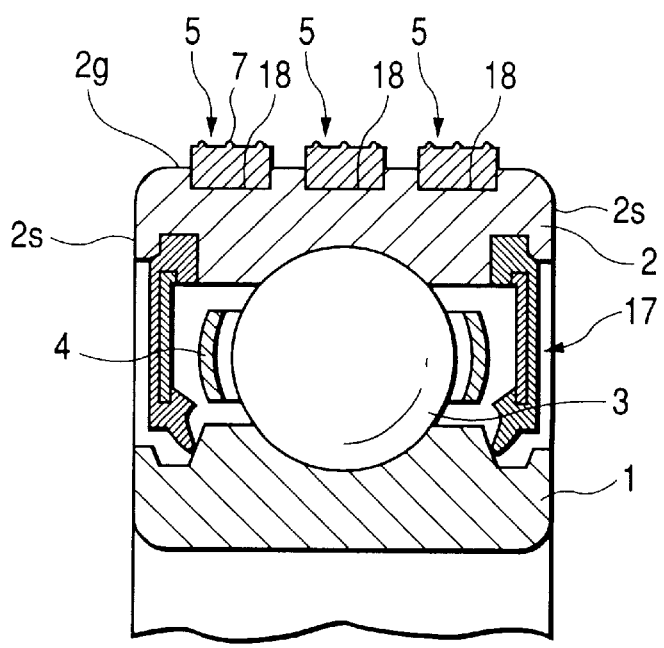
FIG. 14 is a half cross section of a sixth example of the rolling bearing according to the present invention.

A sixth example of the second embodiment is shown in FIG. 14. The bearing of this type is suited to cases in which the both sides 2s, 2s of the outer race 2 are not in contact with a housing and are therefore electrically insulated against the housing. Three annular grooves 18, 18, 18 are formed in parallel to each other on the outer periphery surface 2g of the outer race 2 along its circumferential direction. Annular bands of the thermoplastic elastomer layer 5 having a rectangular section are each fitted into the grooves 18 with their upper half projecting over the surface 2g. The outer periphery surface of each thermoplastic elastomer layer (band) 5 has a number of annular ridges 7 having a half-round section in its circumferential direction in the same manner as shown in FIGS. 5 and 6.

Where the rolling bearing of the sixth example is fitted in a fan motor, the outer periphery surface 2g of the outer race 2 is electrically insulated from the housing by the thermoplastic elastomer bands 5. The both sides 2s, 2s of the outer race 2 are structurally isolated against the housing. The inner and outer raceways and the rolling surface of the ball 3 are thus effectively protected against electrolytic corrosion.

Figure 15:
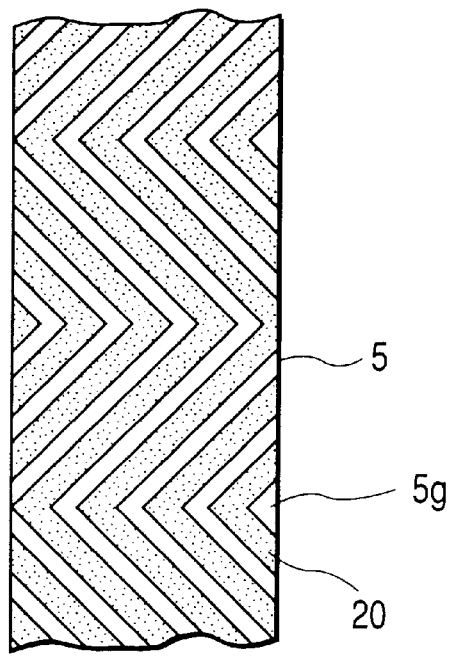
FIG. 15 is a plan of another surface pattern of a thermoplastic elastomer layer of the bearing according to the present invention.
Figure 16:
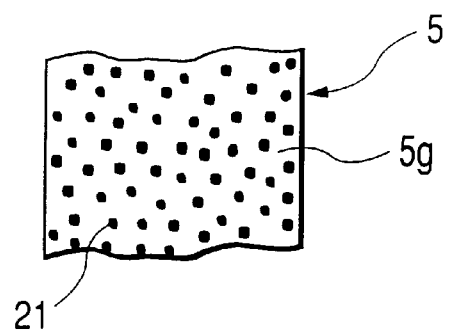
FIG. 16 is a plan of still another surface pattern of a thermoplastic elastomer layer of the bearing according to the present invention.

The pattern of the unevenness to be formed on the outer periphery surface 5g of the thermoplastic elastomer layer 5 according to the second embodiment is not limited to those shown in the foregoing examples, and various other patterns can be used. Examples of other useful patterns are depicted in FIGS. 15 and 16. FIG. 15 shows grooves 20 in a herringbone pattern continuous in the circumferential direction of an outer race, and FIG. 16 shows a large number of projections 21 of unfixed shape, irregularly arranged on the surface 5g.

While the second embodiment of the present invention has been described with particular reference to a deep groove ball bearing, the present invention can be applied as well to other types of rolling bearings, such as an angular ball bearing and a roller bearing.

The embodiment for accomplishing the third object of the present invention is described below by way of a seventh example of the rolling bearing according to the present invention.

Figure 17A:
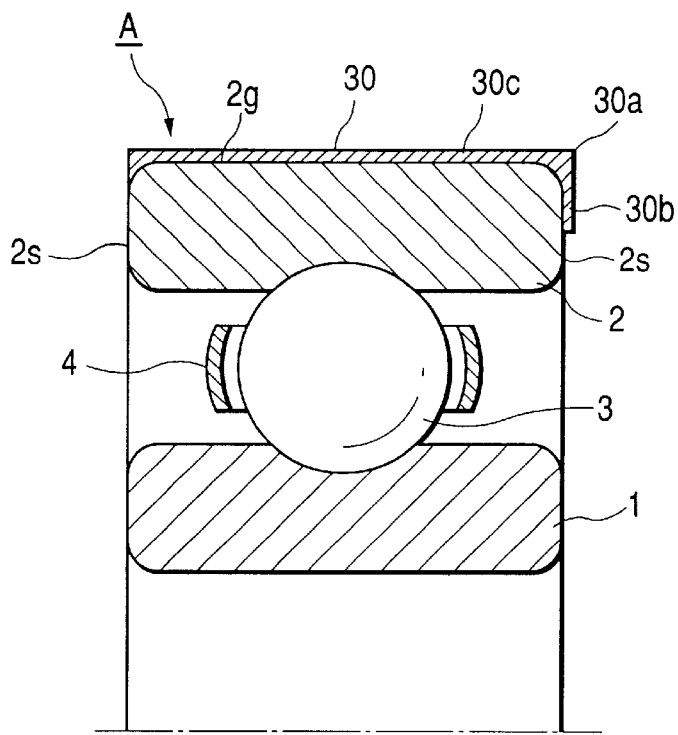
FIG. 17a is a half cross section of a seventh example of the rolling bearing according to the present invention.

The rolling bearing A shown in FIG. 17a has an annular insulating member 30 press-fitted over the outer race 2 thereof so that the outer periphery surface 2g and one of the sides 2s may be covered, with the inner race 1 as it is. Numerals 3 and 4 are a ball and a cage, respectively. The annular insulating member 30 has its corner rounded (indicated by numeral 30a) along the circumferential direction.

The annular insulating member 30 of this example is prepared by injection molding a resin composition consisting of, for example, 40% by weight of a PPS resin, 35% by weight of glass fiber as reinforcing fiber (A), and 25% by weight of manganese ferrite ($MnFe_2O_4$) as magnetic filler (B). In more detail, the components are dry blended in a blender, a Henschel mixer, etc., and the blend is kneaded and pelletized by means of a twin-screw extruder, etc. The resulting compound (pellets) is injected into a mold and cooled for a prescribed cooling time to obtain the annular insulating member 30 having a thickness of 1.0 mm. The annular insulating member 30 is press-fitted onto the outer race 2. If necessary, the annular insulating member 30 is heated to expand before fitting.

Figure 18:
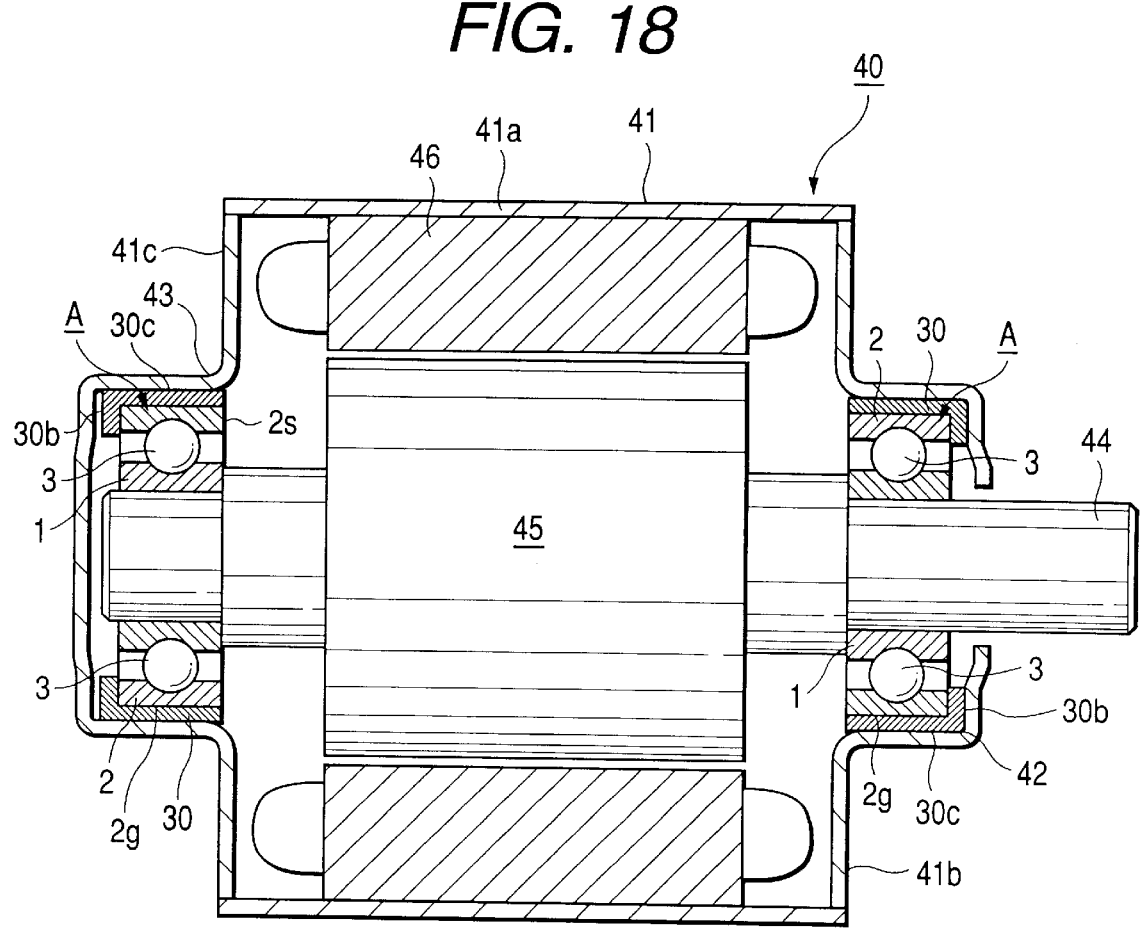
FIG. 18 is a cross section illustrating the fit of the rolling bearing of FIG. 17a into a fan motor.

FIG. 18 shows a cross section of a fan motor 40 in which a pair of the rolling bearings A of FIG. 17a are fitted into a housing 41. One rolling bearing A is fitted into the recess of a retainer 42 of a front cover 41b, and the other is fitted into the recess of a retainer 43 of a rear cover 41c, each via the annular insulating member 30. Numerals 41a, 44, 45, and 46 indicate a main body of the housing 41, a motor rotating axis, a rotor, and a stator, respectively. The rolling bearings A are fixed with a lip 30b of the annular insulating member 30 being pressed onto the recesses of the retainers 42 and 43 so that the non-covered side of both bearings A are facing each other. The one side 2s of the outer race 2 and the recess of the retainers 42 and 43 are thus prevented from coming into contact by the lip 30b, and the outer periphery surface 2g of the outer race 2 and the inner periphery surface of the retainers 42 and 43 are also prevented from coming into contact by the periphery 30c of the annular insulating member 30. Because the other side 2s of the outer race 2 is exposed to open air, it does not need to be covered with the annular insulating member 30.

Thus, if an axial voltage is generated in the rotating axis 44 based on the high frequency current applied from an inverter to the stator 46, the current is inhibited from flowing from the rotating axis 44 to the housing 41. That is, because the outer race 2 of each rolling bearing A supporting the rotating axis 44 is insulated from the housing 41 holding the bearings, even though the potential of the rotating axis 44 becomes higher than that of the housing 41, no electrical current flows through the rolling bearings A. Accordingly, the rolling bearings A are protected against electrolytic corrosion.

The fourth embodiment of the present invention will be described below.

Examples of the rolling bearing according to the fourth embodiment are now illustrated with reference to FIGS. 20 through 25. While the examples shown in FIGS. 20 to 25 are ball bearings, the fourth embodiment can also be applied to roller bearings as well.

In FIGS. 20 to 25 an outer race, an inner race, a rolling element, and a cage are indicated by reference numerals 6, 7, 8, and 9, respectively. Reference numeral 1 indicates an insulating film integrally formed with a seal 2. The particulars of the outer race 6, inner race 7, rolling element 8, and cage 9 used in the fourth embodiment are omitted from the description because conventional structures are applicable to these members.

Figure 20:
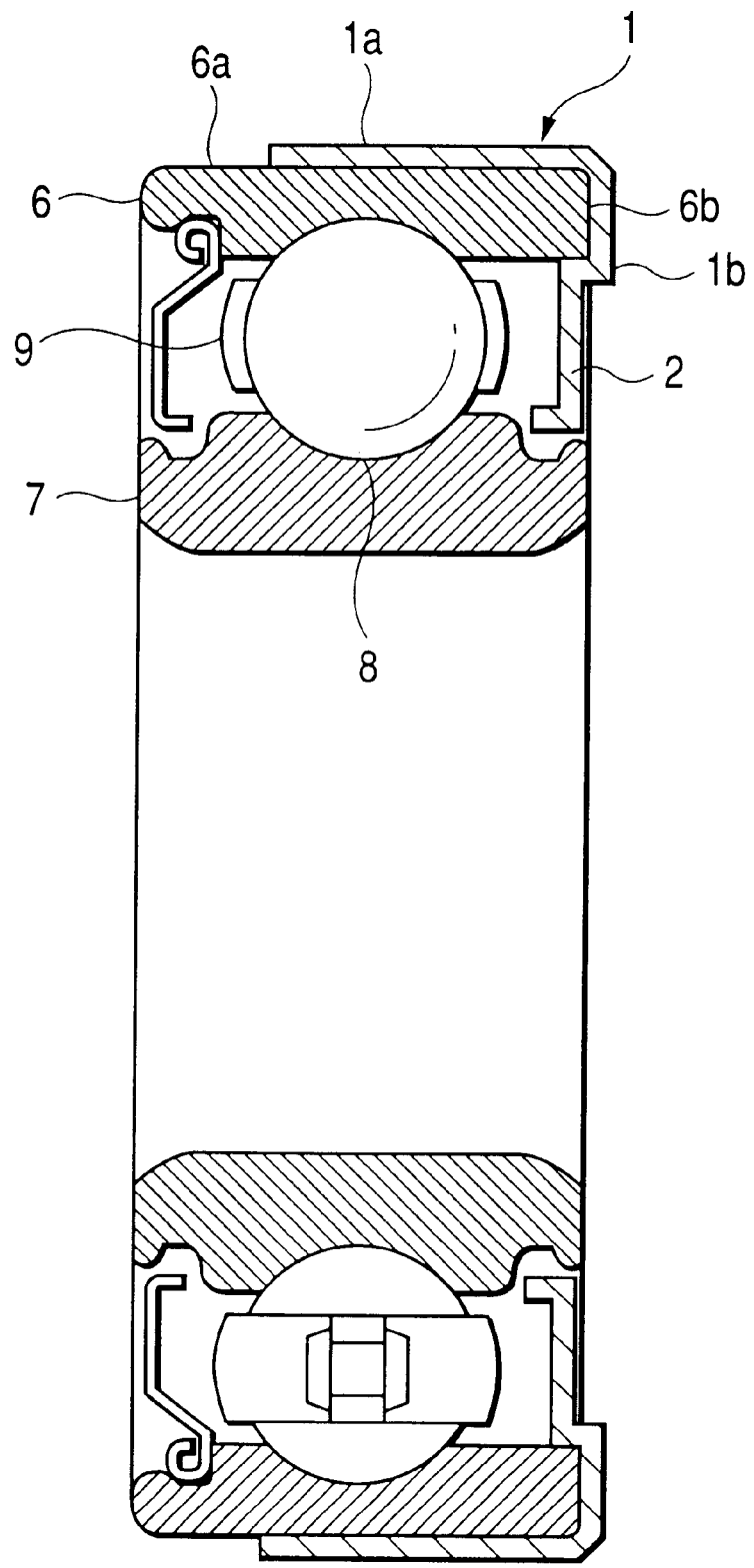
FIGS. 20 through 25 are each a cross section of an example of the rolling bearing according to the present invention.

In FIG. 20, an insulating film 1 formed of, e.g., synthetic rubber, is made up of a portion 1a covering the outer periphery surface 6a of the outer race 6 and a portion 1b extending from the portion 1a to cover the side 6b of the outer race 6. From the end of the insulating film 1b a seal 2 is extending as an integral part.

The insulating film 1 is provided on the outer periphery surface 6a over the whole circumference and on the side 6b over the whole circumference. The insulating film 1a on the outer periphery surface 6a may be provided over part of or the whole width of the periphery surface 6a according to the purpose within the scope of the present invention. While the insulating film 1b and the seal 2 are provided on only the side 6b in the example shown, they can also be provided on the other side 6b as an integral extension from the insulating film 1a.

The thickness ratio of the insulating film 1 to the outer race 6 is not limited and can be arbitrarily selected within the scope of the present invention.

The material of the insulating film 1 is arbitrarily selected from electrically insulating rubber or thermoplastic elastomers. Use of rubber or a thermoplastic elastomer having a larger linear expansion coefficient than bearing steel is also effective on creep prevention. Further, the elasticity of the rubber or thermoplastic elastomer can be taken advantage of for absorbing expansion and contraction in the axial direction that occur on driving the motor.

The structure of the seal 2 which is integrated with the insulating film 1 is not limited to the one shown in FIG. 20. Any other forms known as a seal structure inclusive of the form of the lip can be selected.

The non-contact structure of the seal 2 used in this example is no more than an illustrative example, and the embodiment also applies to a contact type seal.

Accordingly, the outer race 6 is electrically insulated from the housing by the above-described structure. If an inverter-driven fan motor generates an axial voltage, no potential difference is produced between the inner and outer races, and no current flows. The fourth embodiment of the present invention is also advantageous in that the insulating film 1 and the seal 2 can be formed simultaneously.

Figure 21:
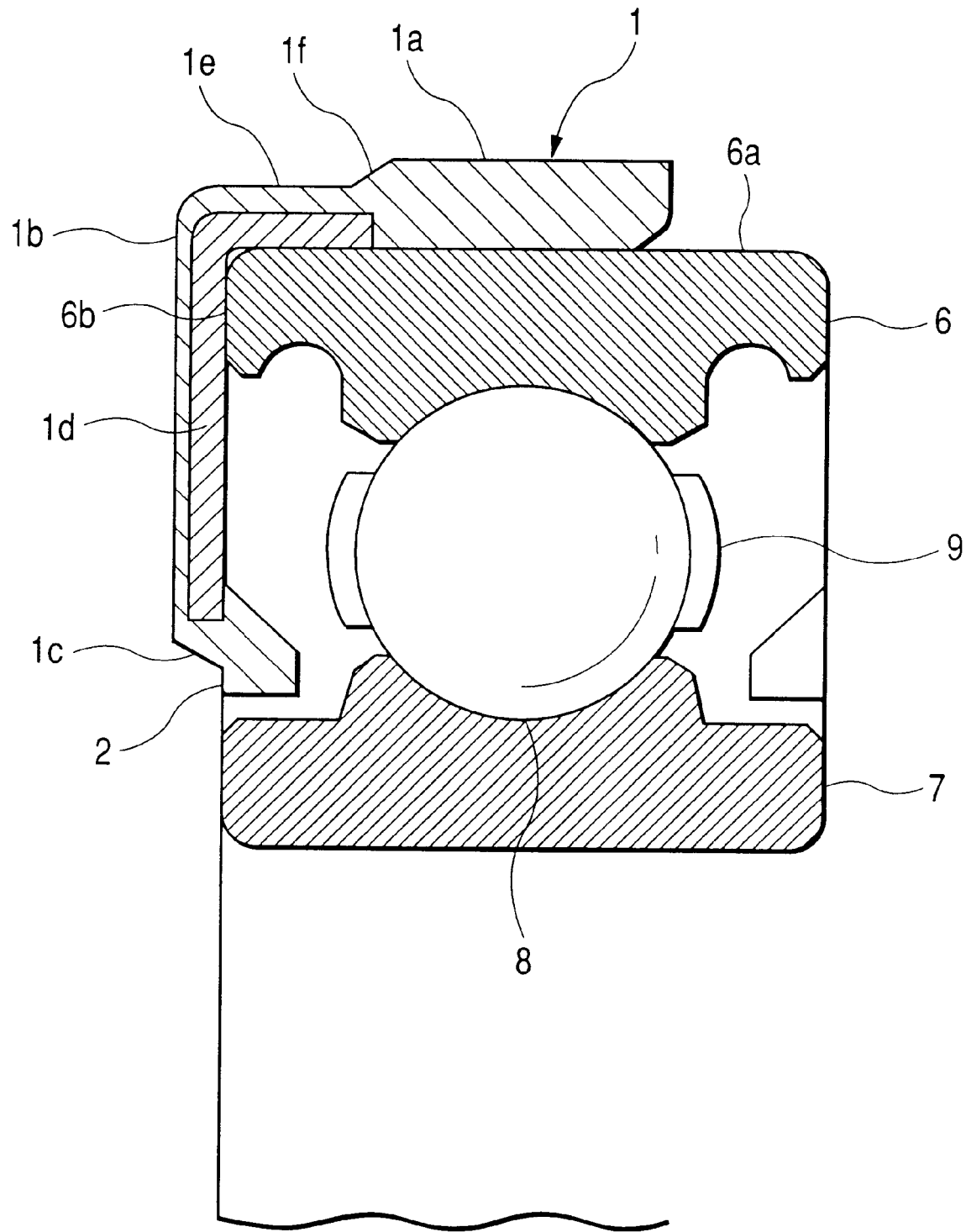

Another example of the fourth embodiment is shown in FIG. 21. In this second example an insulating film 1 and a seal 2, which is integral with the insulating film 1, are composed of a synthetic rubber layer 1c and a metallic core 1d. The insulating film 1 (1a to 1c) is formed on the outer periphery surface 6a and the side 6b of the outer race 6 over the whole circumference.

In the second example, too, the material of the insulating film 1 is arbitrarily selected from electrically insulating rubber or thermoplastic elastomers, and the structure of the seal 2 is subject to variation within the scope of the present invention.

The insulating film 1a comprises a film 1e having a thin thickness on the side to be introduced into a housing, so that the bearing can be fitted into a housing more easily. Furthermore, the easiness in fitting is further improved since the insulating film 1a has a tapered surface 1f having a slightly increased inclination.

It is possible to apply the above-mentioned manipulations on the thickness of the insulating film 1 to the first example shown in FIG. 20 and other examples hereinafter given.

Figure 22:
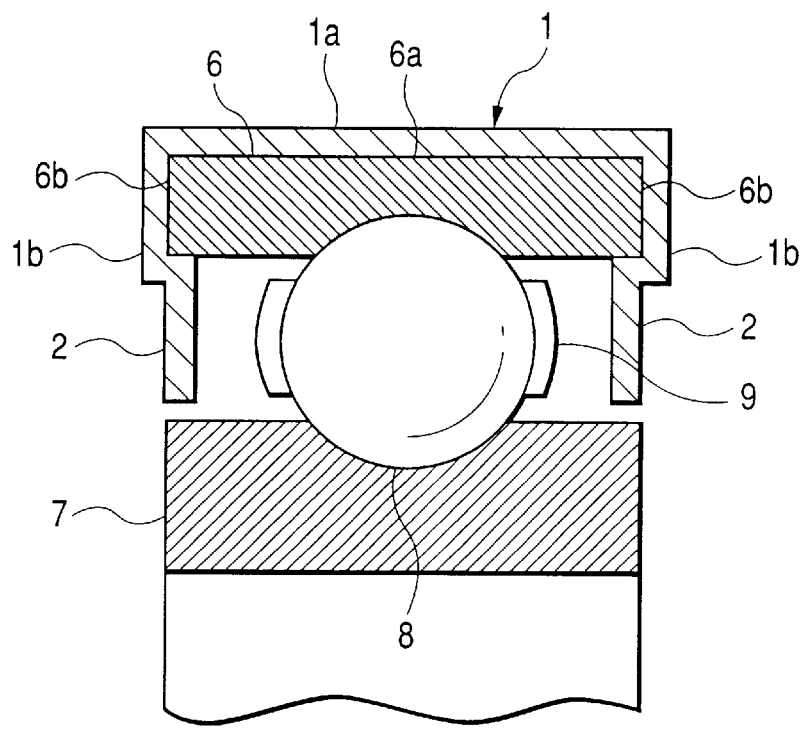

FIG. 22 shows a third example of the fourth embodiment of the present invention. In the third example an insulating film 1 (1a and 1b) is provided to continuously cover the entire surface of the outer periphery 6a and both the sides 6b, 6b, and a seal 2 extends from each insulating film 1b on each side 6b.

The other structural details of the third example are omitted here because the structures of the first and second examples can be applied to the third example. The seal 2 can be formed on both sides of the outer race 6 simultaneously by integral molding.

Figure 23:
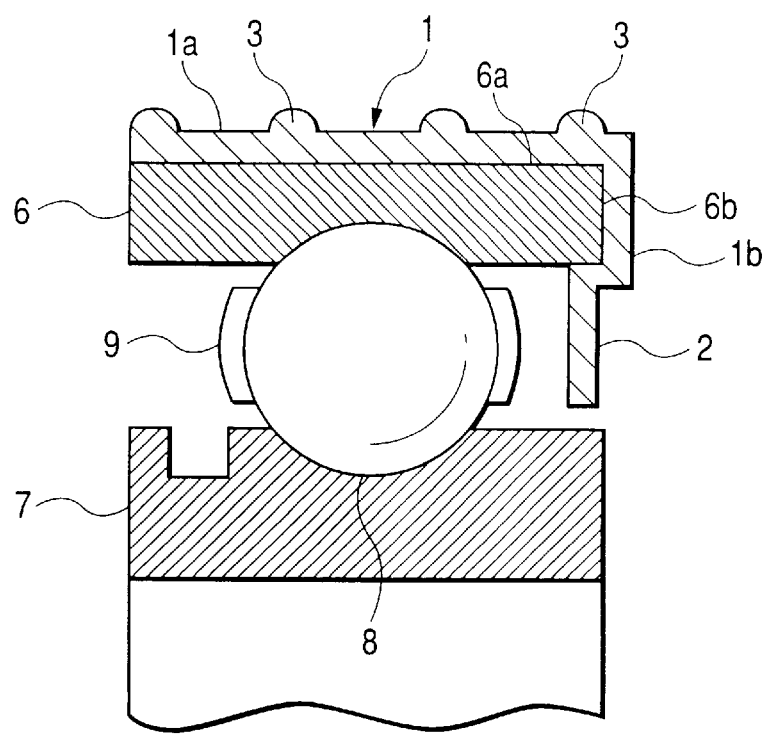
Figure 24:
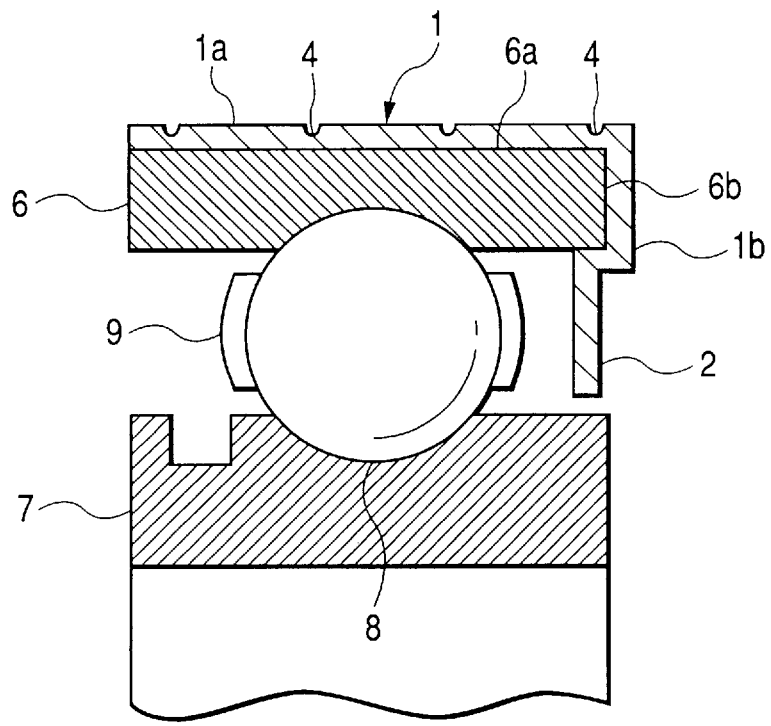
Figure 25:
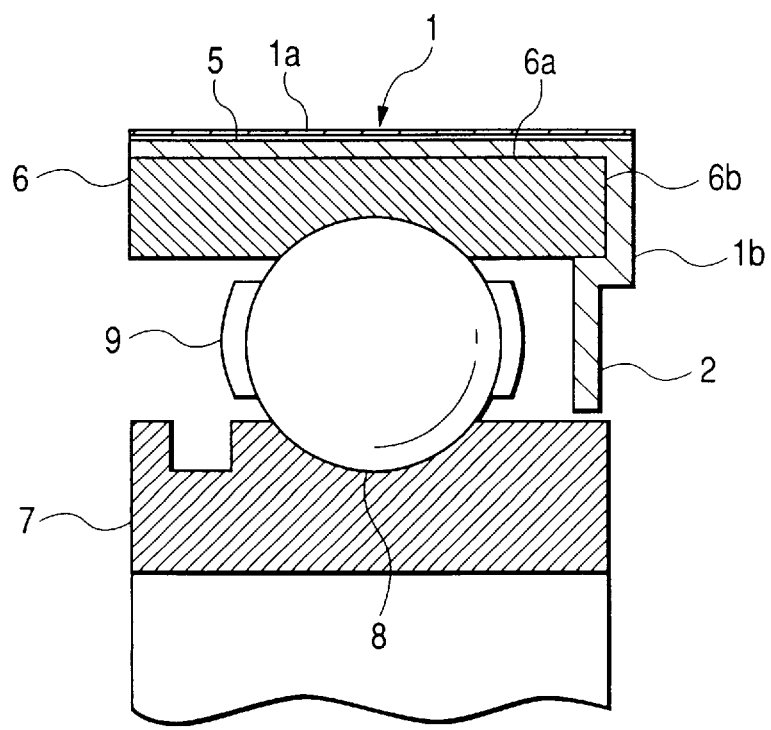

FIG. 23 shows a fourth example of the fourth embodiment, in which an insulating film 1a on the outer periphery surface 6a of the outer race 6 has projections 3 to make its surface uneven. FIG. 24 shows a fifth example, in which an insulating film 1a has grooves 4 in the circumferential direction. FIG. 25 shows a sixth example, in which grooves 5 are provided on the surface of an insulating film 1a along the axial direction. The surface unevenness shown in FIGS. 23 to 25 can also be made on the insulating film 1 of the foregoing first to third examples.

The particulars of the fourth to sixth examples are the same as in the first to third examples shown in FIGS. 20 to 22.

Because the insulating films 1 of the fourth to sixth examples have projections 3 or grooves 4 or 5 on their outer surface to make the contact area with the housing smaller, the insulating film 1 is more deformable and capable of absorbing changes in the axial direction (shrink) due to thermal expansion and the like.

Further, the insulating films 1 of the fourth to sixth examples are also effective to improve the ease of fitting. When combined with the tapering structure of the insulating film 1 on the side to be fitted into a housing as shown in FIG. 21, the uneven surface structure of the insulating film 1 is expected to bring about a striking improvement in ease of fitting. Besides, the insulating film 1 resists in the housing on thermal expansion to exert an anti-creep function.

EXAMPLES

A test was carried out, in which examples of the rolling bearing according to the embodiment accomplishing the first and third objects were compared with a comparative bearing. Rolling bearings having the annular insulating member 30 as shown in FIG. 17a were produced using various formulations as a resin composition for the annular insulating member 30.

Examples 1-1 To 15-2 and Comparative Example 1

Figure 17B:
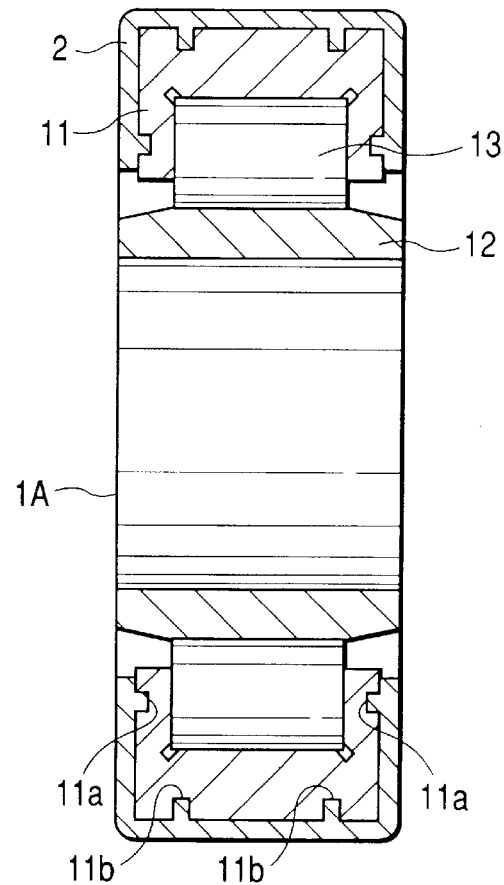
FIG. 17b is a cross section of the rolling bearing according to the present invention.

FIG. 17b shows a cross section of the anti-electrolytic corrosion rolling bearings prepared in Examples 1-1 to 15-2 and Comparative Example 1. Rolling bearing 1A has insulating film 2 on the outer side of outer race 11. Inner race 12 has no insulating film. Numeral 13 indicates a roller. Outer race 11 has formed grooves 11a and 11b on the periphery and both sides thereof.

Resins and fillers were compounded in a blender, a Henschel mixzer etc. according to the formulation shown in Table 9 below, and the blend was fed to an extruder, e.g., a twin-screw extruder, and extruded to obtain pellets. The pellets were injection molded in a mold which was set around outer race 11 and cooled for a prescribed time to form insulating film 2 having a thickness of about 1.0 mm and continuously covering the periphery and the both sides of outer race 11.

The resins and fillers used are as follows.

Resins

PPS (polyphenylene sulfide resin): "Fortron KPS", produced by Xureha Chemical Industry Co., Ltd.

Aromatic PA (aromatic polyamide resin): "Arlen", produced by Mitsui Petrochemical Industries, Ltd.

Filler A

GP (glass fiber): silane coupling agent-treated chopped glass strands, "CS3J-273", made by Nitto Boseki Co., Ltd.

Potassium hexatitanate ($K_2O\cdot 6TiO_2$) whiskers: "Tismo-D", produced by Otaka Chemical Co., Ltd.

Aluminum borate ($9Al_2O_3\cdot 2B_2O_3$) whiskers: "Alborex YS3", produced by Shikoku Chemicals Corp., silane coupling agent-treated Calcium carbonate ($CaCO_3$) whiskers: "Whiscal A", produced by Naruo Calcium Co., Ltd.

Filler B $MnFe_2O_4$, $CoFe_2O_4$, $NiFe_2O_4$: products of Kojundo Chemical Laboratory Co., Ltd.

pillar C

SiC whiskers: "M grade", a product of Idemitsu Material Co., Ltd.

AlN: "AGSD-100", produced by Idemitsu Material Co., Ltd.

BN (h-BN): "F grade", a product of Idemitsu Material Co., Ltd.

$Al_2O_3$: "Aluminum Oxide C", produced by Nippon Aereosil Co., Ltd.

$Al_2O_3$ fiber: "Rubiel, Bulk Fiber T/5470-RS", produced by Nichias Corporation Magnesium oxide (MgO): "Pyrokisuma 5301K", produced by Kyowa Chemical Industry Co., Ltd.

TABLE 9

| Example No. | Resin (wt %) | | Fibrous Filler A (wt %) | | | | Magnetic Filler B (wt %) | | | Nonmagnetic Thermally Conductive Filler C (wt %) | | | | | |
|---|---|---|---|---|---|---|---|---|---|---|---|---|---|---|---|
| | PPS | Aromatic PA | GF | $K_2O\cdot 6TiO_2$ Whiskers | $9Al_2O_3\cdot 2B_2O_3$ Whiskers | $CaCO_3$ Whiskers | $MnFe_2O_4$ | $CoFe_2O_4$ | $NiFe_2O_4$ | SiC Whiskers | AlN | BN | $Al_2O_3$ | $Al_2O_3$ Fiber | MgO |
| 1-1 | 40 | | 35 | | | | 25 | | | | | | | | |
| 1-2 | | 40 | 35 | | | | 25 | | | | | | | | |
| 2-1 | 30 | | 35 | | | | 35 | | | | | | | | |
| 2-2 | | 30 | 35 | | | | 35 | | | | | | | | |
| 3-1 | 30 | | 35 | | | | | 35 | | | | | | | |
| 3-2 | | 30 | 35 | | | | | 35 | | | | | | | |
| 4-1 | 30 | | 35 | | | | | | 35 | | | | | | |
| 4-2 | | 30 | 35 | | | | | | 35 | | | | | | |
| 5-1 | 40 | | 20 | | | | | | | 40 | | | | | |
| 5-2 | | 40 | 20 | | | | | | | 40 | | | | | |
| 6-1 | 35 | | 30 | | | | 10 | | | 25 | | | | | |

TABLE 9-continued

| | Resin (wt %) | | | Fibrous Filler A (wt %) | | | Magnetic Filler B (wt %) | | | Nonmagnetic Thermally Conductive Filler C (wt %) | | | | | |
|---|---|---|---|---|---|---|---|---|---|---|---|---|---|---|---|
| Example No. | PPS | Aromatic PA | GF | $K_2O \cdot 6TiO_2$ Whiskers | $9Al_2O_3 \cdot 2B_2O_3$ Whiskers | $CaCO_3$ Whiskers | $MnFe_2O_4$ | $CoFe_2O_4$ | $NiFe_2O_4$ | SiC Whiskers | AlN | BN | $Al_2O_3$ | $Al_2O_3$ Fiber | MgO |
| 6-2 | | 35 | 30 | | | | 10 | | | 25 | | | | | |
| 7-1 | 35 | | 35 | | | | | | | | 30 | | | | |
| 7-2 | | 35 | 35 | | | | | | | | 30 | | | | |
| 8-1 | 35 | | 35 | | | | | | | | | 30 | | | |
| 8-2 | | 35 | 35 | | | | | | | | | 30 | | | |
| 9-1 | 30 | | 35 | | | | | | | | | | 35 | | |
| 9-2 | | 30 | 35 | | | | | | | | | | 35 | | |
| 10-1 | 35 | | 15 | | | | | | | | | | | 50 | |
| 10-2 | | 35 | 15 | | | | | | | | | | | 50 | |
| 11-1 | 45 | | | | | | | | | 55 | | | | | |
| 11-2 | | 45 | | | | | | | | 55 | | | | | |
| 12-1 | 40 | | | | | | | | | | | | | 60 | |
| 12-2 | | 40 | | | | | | | | | | | | 60 | |
| 13-1 | 40 | | | 30 | | | | | | | | | | | 30 |
| 13-2 | | 40 | | 30 | | | | | | | | | | | 30 |
| 14-1 | 35 | | | | 30 | | | | | | | | | | 35 |
| 14-2 | | 35 | | | 30 | | | | | | | | | | 35 |
| 15-1 | 35 | | | | | 30 | | | | | | | 35 | | |
| 15-2 | | 35 | | | | 30 | | | | | | | 35 | | |
| Compa. Example No. 1 | 60 | | 40 | | | | | | | | | | | | |

The resin compositions used in Examples 1-1 to 15-2 and Comparative Example 1 were evaluated as follows.

1 Thermal Conductivity and Resistivity

Measured at 20° C. in accordance with a laser flash method (Measuring Apparatuses: a thermal constant measuring apparatus and a teeter). The results obtained are shown in Tables 10 to 12.

Each of the resin compositions of Examples 1-1 to 15-2 had a thermal conductivity of higher than 0.5 W/m·K, which was higher than those of the resin composition of Comparative Example 1 and general plastic materials (0.2 to 0.4 W/m·K). The resin compositions of Examples 11-1 to 12-2 containing SiC whisker or $Al_2O_3$ fiber in place of glass fiber exhibited remarkable thermal conductivity.

The resistivity in Examples 1-1 to 15-2 was lower than that of Comparative Example 1 but yet higher than $1 \times 10^{13}$ Ω·cm, showing sufficient electrical insulating properties.

2 Weld Strength and Izod Impact Strength

The resin composition was injected into a mold cavity from both ends of the mold to prepare a specimen (JIS #1; thickness: 3 mm) having a weld portion in the center thereof. The weld strength of the specimen was measured at 23° C. at a pulling rate of 5 mm/min.

A notched specimen was prepared from the resin composition, and an Izod impact strength was measured at 23° C.

The results obtained are shown in Tables 10 to 12.

The resin compositions of Examples 1-1 to 10-2 which contained glass fiber having high reinforcing properties as a filler for the matrix resin, and those of Examples 13-1 to 15-2 containing whiskers which are a reinforcing fibrous filler A exhibited a weld strength of 70 MPa or more with no noticeable difference among them. The resin compositions of Examples 11-1 and 11-2 containing SiC whisker which is not a fibrous filler A but a nonmagnetic thermally conductive filler C and those of Examples 12-1 and 12-2 containing alumina fiber, all had a weld strength of 70 MPa or more.

Because filler B and/or filler C was/were used while reducing the proportion of reinforcing fibrous filler A than that in Comparative Example 1 (40 wt % of glass fiber), the Izod impact strength was lower than in Comparative Example 1 on the average but yet exceeded 2.0 kJ/m², a sufficient level for practical use.

3) Creep Resistance

Figure 19:
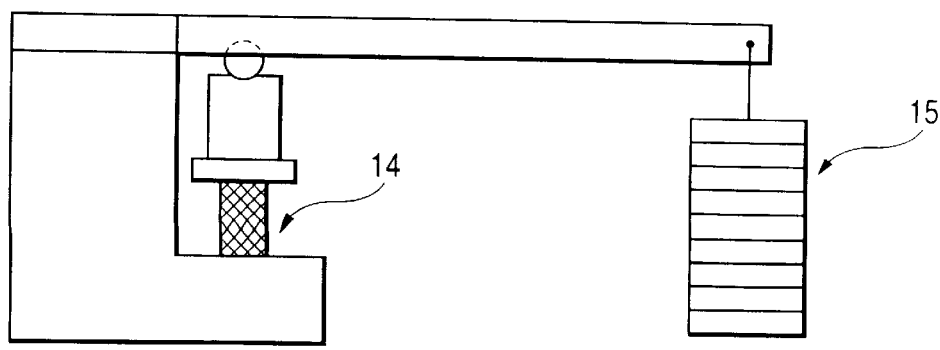
FIG. 19 is a schematic cross section of the apparatus used in a creep resistance test.

Each resin composition was molded into a column test piece. On a creep teeter as shown in FIG. 19, test piece (14) was set and a load (15) was applied thereon (planar pressure: 2.9 kg/mm²), and the tester was placed in a thermostat set at 120° C. for 100 hours. After taken out, it was kept at room temperature for 1 hour, and its height was measured to obtain a rate of change. The results obtained are shown in Tables 10 to 12.

It can be seen that the rate of change of height in all the Examples was smaller than that in Comparative Example 1, exhibiting satisfactory creep resistance. The resin compositions of Examples 1-1 to 4-2 which contained not only glass fiber but also a magnetic filler B, those of Examples 10-1 and 10-2 which contained not only glass fiber but also alumina fiber, and those of Examples 11-1 to 12-2 which contained not glass fiber but SiC whisker or alumina fiber, all had small change rate, exhibiting remarkable creep resistance.

4) Maxium Temperature of Inner Race

Each of the anti-electrolytic corrosion rolling bearings 1A of FIG. 17b, prepared in Examples 1-1 to 15-2 and Comparative Example 1 (inner diameter: 70 mm; outer diameter: 150 mm; width: 35 mm), was pressed into a housing. A prescribed amount of grease (about 25% of the space within the bearing) was sealed into the bearing. After priming running under prescribed conditions, the speed of revolution was rapidly increased up to 7000 rpm and maintained constant for about 1 hour at room temperature. The temperature T of inner race 12 was recorded at certain time intervals during the running at 7000 rpm. The maximum temperature of the inner race is shown in Tables 10 to 12.

Owing to the increased thermal conductivity of the insulating film, the bearings of Examples 1-1 to 15-2 could effectively dissipate the heat evolved on revolution. As a result, the rolling bearings of the present invention had their inner race temperature lowered by 40° C. or more as compared with the bearing of Comparative Example 1. Especially, it was confirmed that the resin compositions of Examples 11-1 to 12-2 containing SiC whisker or $Al_2O_3$ fiber and having a remarkable thermal conductivity as shown in Table 12 exhibited large heat dissipation.

TABLE 10

|  | Example 1-1 | Example 1-2 | Example 2-1 | Example 2-2 | Example 3-1 | Example 3-2 | Example 4-1 | Example 4-2 | Example 5-1 | Example 5-2 |
|---|---|---|---|---|---|---|---|---|---|---|
| Thermal Conductivity (W/m · K) | 0.54 | 0.54 | 0.71 | 0.71 | 0.71 | 0.71 | 0.67 | 0.67 | 0.65 | 0.65 |
| Resistivity (Ω · cm) | $5 \times 10^{14}$ | $5 \times 10^{14}$ | $5 \times 10^{13}$ | $5 \times 10^{13}$ | $5 \times 10^{14}$ | $5 \times 10^{14}$ | $5 \times 10^{14}$ | $5 \times 10^{14}$ | $5 \times 10^{15}$ | $5 \times 10^{15}$ |
| Weld Strength (MPa) | 79 | 81 | 76 | 78 | 76 | 78 | 76 | 78 | 75 | 77 |
| Izod Impact Strength (kJ/m$^2$) | 5.4 | 5.7 | 5.1 | 5.4 | 5.1 | 5.4 | 5.1 | 5.4 | 5.1 | 5.4 |
| Rate of Change (%) | −1.94 | −1.88 | −1.84 | −1.78 | −1.83 | −1.78 | −1.85 | −1.79 | −2.35 | −2.28 |
| Max. Inner Race Temp. (° C.) | 120 | 120 | 110 | 110 | 110 | 110 | 112 | 112 | 113 | 113 |

TABLE 11

|  | Example 6-1 | Example 6-2 | Example 7-1 | Example 7-2 | Example 8-1 | Example 8-2 | Example 9-1 | Example 9-2 | Example 10-1 | Example 10-2 |
|---|---|---|---|---|---|---|---|---|---|---|
| Thermal Conductivity (W/m · K) | 0.62 | 0.62 | 0.63 | 0.63 | 0.61 | 0.61 | 0.54 | 0.54 | 0.62 | 0.62 |
| Resistivity (Ω · cm) | $5 \times 10^{14}$ | $5 \times 10^{14}$ | $5 \times 10^{14}$ | $5 \times 10^{14}$ | $5 \times 10^{14}$ | $5 \times 10^{14}$ | $5 \times 10^{15}$ | $5 \times 10^{15}$ | $5 \times 10^{15}$ | $5 \times 10^{15}$ |
| Weld Strength (MPa) | 76 | 78 | 77 | 79 | 76 | 78 | 75 | 77 | 78 | 80 |
| Izod Impact Strength (kJ/m$^2$) | 6.0 | 6.3 | 5.8 | 6.1 | 5.9 | 6.2 | 5.8 | 6.1 | 7.5 | 7.9 |
| Rate of Change (%) | −2.10 | −2.04 | −1.98 | −1.92 | −1.92 | −1.86 | −2.01 | −1.95 | −1.85 | −1.79 |
| Max. Inner Race Temp. (° C.) | 115 | 115 | 115 | 115 | 116 | 116 | 120 | 120 | 115 | 115 |

TABLE 12

|  | Example 11-1 | Example 11-2 | Example 12-1 | Example 12-2 | Example 13-1 | Example 13-2 | Example 14-1 | Example 14-2 | Example 15-1 | Example 15-2 | Compara. Example 1 |
|---|---|---|---|---|---|---|---|---|---|---|---|
| Thermal Conductivity (W/m · K) | 0.80 | 0.80 | 0.72 | 0.72 | 0.67 | 0.67 | 0.68 | 0.68 | 0.55 | 0.55 | 0.35 |
| Resistivity (Ω · cm) | $6 \times 10^{14}$ | $6 \times 10^{14}$ | $1 \times 10^{15}$ | $1 \times 10^{15}$ | $7 \times 10^{14}$ | $7 \times 10^{14}$ | $2 \times 10^{14}$ | $2 \times 10^{14}$ | $3 \times 10^{13}$ | $3 \times 10^{13}$ | $5 \times 10^{16}$ |
| Weld Strength (MPa) | 72 | 74 | 74 | 76 | 70 | 72 | 71 | 73 | 71 | 71 | 76 |
| Izod Impact Strength (kJ/m$^2$) | 2.5 | 2.6 | 5.1 | 5.4 | 2.7 | 2.8 | 2.8 | 2.9 | 2.6 | 2.7 | 7.7 |
| Rate of Change (%) | −1.95 | −1.89 | −1.70 | −1.65 | −2.03 | −1.97 | −2.20 | −2.13 | −2.30 | −2.23 | −2.49 |
| Max. Inner Race Temp. (° C.) | 105 | 105 | 109 | 109 | 112 | 112 | 111 | 111 | 120 | 120 | 160 |

The insulating film is provided on the outer peripheral surface of the outer race and the end surface 2s in the embodiments shown in FIGS. 5, 8, 10, 13, 14, and 17a, but the object of the present invention can be also achieved by providing the insulating film on the inner peripheral surface of the inner race 1 or at least one of the end surfaces of the inner race 1.

As has been fully demonstrated, the anti-electrolytic corrosion rolling bearing according to the first embodiment has on at least one of the outer and inner races thereof an insulating film comprising a synthetic resin composition having a resistivity of not less than $1 \times 10^{13}$ Ω·cm and a thermal conductivity of not less than 0.5 W/m·K. As a result, the rolling bearing is excellent in not only electrical insulating properties and creep resistance but also heat dissipation properties. In the embodiment wherein the synthetic resin composition contains creep-resistant fibrous filler A and magnetic filler 8 having a specific saturation magnetization and a specific resistivity in a total amount (A+B) of 30 to 75% by weight, the resulting insulating film exhibits improved performance in creep resistance, heat conduction, molding, and electrical insulation owing to the action of magnetic filler B in improving electrical insulating properties and thermal conductivity. Anti-electrolytic corrosion rolling bearings with such an insulating film can be assured of stabilized performance even when used under such conditions that the insulating film is exposed to a high temperature at a high speed of revolution as in the motor of rolling stock. The above effects are also produced when at least part of magnetic filler B is replaced with nonmagnetic thermally conductive filler C. Physical and electrical properties of the insulating film such as creep resistance, thermal conductivity, moldability and electrical insulating properties, can be adjusted by appropriately varying the content of filler B and/or filler C within a range of from 20 to 65% by weight so as to provide well-balanced performance in accordance with the particular use of the bearing.

Furthermore, the thermoplastic elastomer layer which covers the outer peripheral portion of an outer race according to the second embodiment or the annular insulating member provided on the outer peripheral portion of an outer race according to the third embodiment hinders electrical connection between the outer race and a surrounding housing. When used in an inverter-driven fan motor, the rolling bearing according to the present invention successively shut a current flow between the inner and outer races without using conventional problematical means, such as special grease or an electrical brush that is apt to produce dust. Therefore, the inner and outer raceways and the rolling surface of rolling elements can be protected against electrolytic corrosion without involving the problems of the conventional anti-corrosion means. Where the thermoplastic elastomer layer is made easily deformable by providing unevenness on its outer periphery surface, there is obtained an additional effect that the bearing can easily be inserted into the housing and the thermoplastic elastomer layer resists in the housing to exert an anti-creep function. Where the thermoplastic elastomer layer contains a thermally conductive filler, the layer exhibits improved thermal conductivity to let the heat generated escape easily while retaining satisfactory electrical insulating properties. As a result, thermal deterioration of the thermoplastic elastomer can be suppressed.

The anti-electrolytic corrosion rolling bearing according to the third embodiment has on at least one of the outer and inner races thereof an annular insulating member composed of a synthetic resin composition having a resistivity of not less than $1 \times 10^{13}$ Ω·cm and a thermal conductivity of not less than 0.5 W/m·K. As a result, the rolling bearing of the invention is excellent in not only electrical insulating properties and creep resistance but also heat dissipation properties.

According to the fourth embodiment of the present invention hereinabove described, an insulating film is provided on the outer peripheral surface and at least one of the sides of the outer race, and the insulating film and a seal have an integral structure. Therefore, a rolling bearing which is protected against electrolytic corrosion by shutting an electrical connection between the outer race and the housing can be provided at a low cost a little higher than the cost for making a seal. Even when used in an inverter-driven fan motor where a rolling bearing often suffers from electrolytic corrosion, the bearing according to the present invention is protected from electrolytic corrosion owing to the electrical insulation between the outer race and the housing without using special grease or setting an electrical brush. Accordingly, the bearing of the present invention not only eliminates the problems associated with these conventional means but makes it feasible to cut down the cost. For example, an electrical brush, one of the conventional means, has limited application because it generates dust and is unsuitable for use in a clean room. The bearing of the present invention is freed of such a problem and therefore enjoys a broadened range of application.

While the invention has been described in detail and with reference to specific examples thereof, it will be apparent to one skilled in the art that various changes and modifications can be made therein without departing from the spirit and scope thereof.

What is claimed is:

1. An anti-electrolytic corrosion rolling bearing having at least an outer race, an inner race, and rolling elements interposed between the outer and inner races, which has an insulating body on at least one of the outer peripheral surface of the outer race, the inner peripheral surface of the inner race, and the side surfaces of the outer race and inner race, said insulating body being composed of an insulating film or insulating member each containing at least one of a thermoplastic synthetic resin, a rubber, and a thermoplastic elastomer as a base material and having a resistivity of not less than $1\times10^{13}$ $\Omega\cdot$cm and a thermal conductivity of not less than 0.5 W/m·K.

2. The anti-electrolytic corrosion rolling bearing of claim 1, wherein the insulating body contains a rubber or a thermoplastic elastomer as a base material, and has an A scale durometer hardness of 60 to 90, a thickness of from 0.5 to 5 mm, and unevenness having a height or depth of 5 to 100 μm on the outer surface of the insulating body.

3. The anti-electrolytic corrosion rolling bearing of claim 1, wherein the insulating body to be formed on at least one of the outer peripheral portion of the outer race, the inner peripheral portion of the inner race and the end surfaces of the outer race and inner race, and a seal composed of an insulating body are integrally formed, the insulating body comprising a rubber or a thermoplastic elastomer as a base material.

4. The anti-electrolytic corrosion rolling bearing of claim 1, wherein said insulating body is composed of a composition comprising (A) a fibrous filler having a thermal conductivity of less than 10 W/m·K and a resistivity of not less than $1\times10^3$ $\Omega\cdot$cm and (B) a magnetic filler having a saturation magnetization of not less than 20 emu/g and a resistivity of not less than $1\times10^3$ $\Omega\cdot$cm.

5. The anti-electrolytic corrosion rolling bearing of claim 4, wherein said magnetic filler (B) is present in a total proportion of 20 to 65% by weight based on said composition.

6. The anti-electrolytic corrosion rolling bearing of claim 4, wherein said fibrous filler (A) and said magnetic filler (B) are present in a total proportion of 30 to 75% by weight based on said composition.

7. The anti-electrolytic corrosion rolling bearing of claim 4, wherein said fibrous filler (A) and said magnetic filler (B) are present in a total proportion of 50 to 75% by weight based on said composition.

8. The anti-electrolytic corrosion rolling bearing of claim 1, wherein said insulating body is composed of a composition comprising (A) a fibrous filler having a thermal conductivity of less than 10 W/m·K and a resistivity of not less than $1\times10^3$ $\Omega\cdot$cm and (C) a nonmagnetic thermally conductive filler having a thermal conductivity of not less than 10 W/m·K and a resistivity of not less than $1\times10^3$ $\Omega\cdot$cm.

9. The anti-electrolytic corrosion rolling bearing of claim 8, wherein said nonmagnetic thermally conductive filler (C) is present in a total proportion of 20 to 65% by weight based on said composition.

10. The anti-electrolytic corrosion rolling bearing of claim 8, wherein said fibrous filler (A) and said nonmagnetic thermally conductive filler (C) are present in a total proportion of 30 to 75% by weight based on said composition.

11. The anti-electrolytic corrosion rolling bearing of claim 8, wherein said fibrous filler (A) and said nonmagnetic thermally conductive filler (C) are present in a total proportion of 50 to 75% by weight based on said composition.

12. The anti-electrolytic corrosion rolling bearing of claim 1, wherein said insulating body is composed of a composition comprising (A) a fibrous filler having a thermal conductivity of less than 10 W/m·K and a resistivity of not leas than $1\times10^3$ $\Omega\cdot$cm, (B) a magnetic filler having a saturation magnetization of not less than 20 emu/g and a resistivity of not less than $1\times10^3$ $\Omega\cdot$cm, and (C) a nonmagnetic thermally conductive filler having a thermal conductivity of not less than 10 W/m·K and a resistivity of not less than $1\times10^3$ $\Omega\cdot$cm.

13. The anti-electrolytic corrosion rolling bearing of claim 12, wherein said magnetic filler (B) and said nonmagnetic thermally conductive filler (C) are present in a total proportion of 20 to 65% by weight based on said composition.

14. The anti-electrolytic corrosion rolling bearing of claim 12, wherein said fibrous filler (A), said magnetic filler (B), and said nonmagnetic thermally conductive filler (C) are present in a total proportion of 30 to 75% by weight based on said composition.

15. The anti-electrolytic corrosion rolling bearing of claim 12, wherein said fibrous filler (A), said magnetic filler (B), and said nonmagnetic thermally conductive filler (C) are present in a total proportion of 50 to 75% by weight based on said composition.

16. The anti-electrolytic corrosion rolling bearing of claim 1, wherein said insulating body is composed of a composition comprising at least (C) a nonmagnetic thermally conductive filler having a thermal conductivity of not less than 10 W/m·K and a resistivity of not less than $1\times10^3$ $\Omega\cdot$cm and being a fibrous or whisker form.

17. The anti-electrolytic corrosion rolling bearing of claim 16, wherein said nonmagnetic thermally conductive filler (C) is present in a proportion of 30 to 75% by weight based on said composition.

18. The anti-electrolytic corrosion rolling bearing of claim 16, wherein said insulating body further contains (B) a magnetic filler having a saturation magnetization of not less than 20 emu/g and a resistivity of not less than $1\times10^3$ $\Omega\cdot$cm.

19. The anti-electrolytic corrosion rolling bearing of claim 18, wherein said magnetic filler (B) and said nonmagnetic thermally conductive filler (C) are present in a total proportion of 30 to 75% by weight based on said composition.

20. The anti-electrolytic corrosion rolling bearing of claim 1, wherein said insulating body has a weld strength of not less than 70 MPa and an Izod impact strength of not less than 2 kJ/m².

21. An anti-electrolytic corrosion rolling bearing having at least an outer race, an inner race, and rolling elements interposed between the outer and inner races, which has an insulating body on at least one of the outer peripheral surface of the outer race, the inner peripheral surface of the inner race, and the side surfaces of the outer race and inner race, said insulating body being composed of an insulating film or insulating member each containing at least one of a rubber and a thermoplastic elastomer as a base material and having an A scale durometer hardness of 60 to 90, a thickness of from 0.5 to 5 mm, and unevenness having a height or depth of 5 to 100 μm on the outer surface of the insulating body.

\* \* \* \* \*